United States Patent
Roy et al.

(10) Patent No.: US 11,418,381 B2
(45) Date of Patent: Aug. 16, 2022

(54) HYBRID CLOUD INTEGRATION DEPLOYMENT AND MANAGEMENT

(71) Applicant: Accenture Global Solutions Limited, Dublin (IE)

(72) Inventors: Debashish Roy, San Diego, CA (US); Benjamin McCarthy, Everett, WA (US); Cory King, Calgary (CA); Brent Shaffer, San Diego, CA (US); Sudeep Mukherjee, Cypress, CA (US)

(73) Assignee: Accenture Global Solutions Limited, Dublin (IE)

( * ) Notice: Subject to any disclaimer, the term of this patent is extended or adjusted under 35 U.S.C. 154(b) by 4 days.

(21) Appl. No.: 16/894,444

(22) Filed: Jun. 5, 2020

(65) Prior Publication Data

US 2021/0385124 A1    Dec. 9, 2021

(51) Int. Cl.
| | |
|---|---|
| *H04L 41/0654* | (2022.01) |
| *G06F 9/54* | (2006.01) |
| *G06Q 10/06* | (2012.01) |
| *H04L 41/0803* | (2022.01) |
| *H04L 43/0823* | (2022.01) |

(52) U.S. Cl.
CPC .......... *H04L 41/0654* (2013.01); *G06F 9/547* (2013.01); *G06Q 10/067* (2013.01); *H04L 41/0803* (2013.01); *H04L 43/0823* (2013.01)

(58) Field of Classification Search
CPC ............... G06F 11/0793; G06F 9/3012; H04L 41/0803; H04L 43/026
See application file for complete search history.

(56) References Cited

U.S. PATENT DOCUMENTS

| | | | |
|---|---|---|---|
| 2004/0176968 | A1 | 9/2004 | Syed et al. |
| 2015/0222504 | A1* | 8/2015 | Srivastava .......... G06F 11/3041 709/224 |
| 2015/0341240 | A1 | 11/2015 | Iyoob et al. |
| 2017/0171026 | A1* | 6/2017 | Lucas ................. G06F 11/1441 |
| 2017/0180211 | A1 | 6/2017 | Johnson |
| 2017/0192778 | A1* | 7/2017 | Srivastava ............... G06F 8/20 |
| 2020/0274945 | A1* | 8/2020 | Rolando ................ G06F 9/546 |
| 2020/0278920 | A1* | 9/2020 | Khakare ............. G06F 11/3664 |
| 2021/0067468 | A1* | 3/2021 | Cidon ..................... H04L 67/10 |
| 2021/0081848 | A1* | 3/2021 | Polleri ................ G06K 9/6259 |
| 2021/0255917 | A1* | 8/2021 | Reitbauer ........... G06F 11/0751 |

FOREIGN PATENT DOCUMENTS

WO         03/102722 A2    12/2003

* cited by examiner

*Primary Examiner* — Mahran Y Abu Roumi

(74) *Attorney, Agent, or Firm* — Plumsea Law Group, LLC

(57) ABSTRACT

A system and method of deploying and managing an integration for a hybrid computing environment is disclosed. The proposed systems and methods provide an intelligent hybrid cloud architecture and environment that offers reduced deployment times, and little to no errors. The system incorporates an artificial intelligence (AI) powered solution that is API-enabled and pre-integrated with system chatbots, as well as providing a secure, accelerated integration with available cloud ecosystems. The proposed solution is able to analyze business processes and derive and build deep insights toward the enterprise cloud integration, improving security, design, and performance of the hybrid architecture.

18 Claims, 14 Drawing Sheets

HYBRID CLOUD INTEGRATION DEPLOYMENT AND MANAGEMENT

TECHNICAL FIELD

The present disclosure generally relates to the automation and management of the integration of data processing resources. More specifically, the present disclosure generally relates to a system and method for intelligently augmenting and monitoring the processing and operations associated with platforms and systems configured as hybrid cloud computing environments.

BACKGROUND

A majority of information technology environments are becoming fundamentally hybrid in nature, where devices, systems, and people are spread across the globe, while operating virtually. Achieving integration across this type of dynamic environment and providing services at the pace of modern digital initiatives is a significant challenge. With the growing need to connect diverse computing endpoints in various locations, a hybrid integration platform is crucial for bringing together cloud-based and on-premises integration approaches. Many companies that adopt cloud applications view application integration as the critical component to harmonize business processes across their hybrid application landscape. Hybrid integration may be understood to encompass a broad range of perspectives including (a) applications, (b) data, and (c) infrastructure. Cloud computing is distinguished from other similar computing paradigms—such as utility computing—in that cloud computing consumers need not have (and are generally precluded from) knowledge of, visibility in, and control over the actual technology infrastructure used to provide the obtained service.

Some benefits of integrating on-premises and cloud-based systems include providing businesses the ability to provision additional resources on demand, dynamically scale a company's application or system, and limit costs to reflect actual resource usage and consumption. In addition, the advantages inherent to avoiding constructing and maintaining a network architecture—such as eliminating the time required for hardware procurement and assimilation and the difficulties of software integration—are also provided through the utilization of cloud computing.

However, while there are many benefits, hybrid integration presents several challenges. Cloud integration service hosts have struggled to offer system stability and reliability in diverse ever-changing business process environments. Such services must also ensure continuous, in-depth monitoring and scalability between on premise and cloud applications, while supporting rapid, error-free security configurations.

There is a need in the art for a system and method that addresses the shortcomings discussed above.

SUMMARY

A system and method for deploying, managing, and maintaining an integration platform for a hybrid cloud computing environment is disclosed. Business entities are increasingly in need of a means by which they can augment their own data processing resources selectively with cloud-based services. Successfully establishing this type of hybrid environment typically involves bringing together on-premise enterprise infrastructure, platform, applications, or data and off-premise cloud service infrastructure, platform, applications, or data in an integrated manner. Cloud computing solutions of this type are riddled with integration, interoperability, and management problems. The system and method solve the problems discussed above by providing a comprehensive and substantially autonomous intelligent cloud integration solution which can be customized to meet the needs of a particular entity's infrastructure and goals. The integration platform is further configured to operate with little to no human intervention. The automated architecture applies machine learning algorithms to determine the most appropriate components and operations for a given enterprise.

In one aspect, the disclosure provides a method of deploying and managing an integration for a hybrid computing environment. The method includes receiving, from a first entity, a configuration request, and automatically selecting, based on the configuration request and a business process map for the first entity, a first business process. The method also includes automatically identifying, based on the configuration request and the first business process, a first application programming interface (API) for providing services associated with the first business process, and then automatically deploying the first API. In addition, the method includes automatically obtaining first data about a first operation state during a first time period for the hybrid computing environment. The method further includes automatically generating at least a first observation indicating a first error occurring during the first time period based on discrepancies detected between the first data and data representing an optimal operation state for the hybrid computing system, and then automatically executing a first healing action in response to the first observation.

In another aspect, the disclosure provides a system for deploying and managing an integration for a hybrid computing environment. The system includes a processor and machine-readable media including instructions which, when executed by the processor, cause the processor to receive, from a first entity, a configuration request and to automatically select, based on the configuration request and a business process map for the first entity, a first business process. The instructions further cause the processor to automatically identify, based on the configuration request and the first business process, a first application programming interface (API) for providing services associated with the first business process, and then to automatically deploy the first API. The instructions also cause the processor to automatically obtain first data about a first operation state during a first time period for the hybrid computing environment and to automatically generate at least a first observation indicating a first error occurring during the first time period based on discrepancies detected between the first data and data representing an optimal operation state for the hybrid computing system. Finally, the instructions cause the processor to automatically executing a first healing action in response to the first observation.

In another aspect, the disclosure provides a system that includes one or more computers and one or more storage devices storing instructions that are operable, when executed by the one or more computers, to cause the one or more computers to receive, from a first entity, a configuration request, and to automatically select, based on the configuration request and a business process map for the first entity, a first business process. The instructions also cause the one or more computers to automatically identify, based on the configuration request and the first business process, a first application programming interface (API) for providing services associated with the first business process, and automatically deploy the first API.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
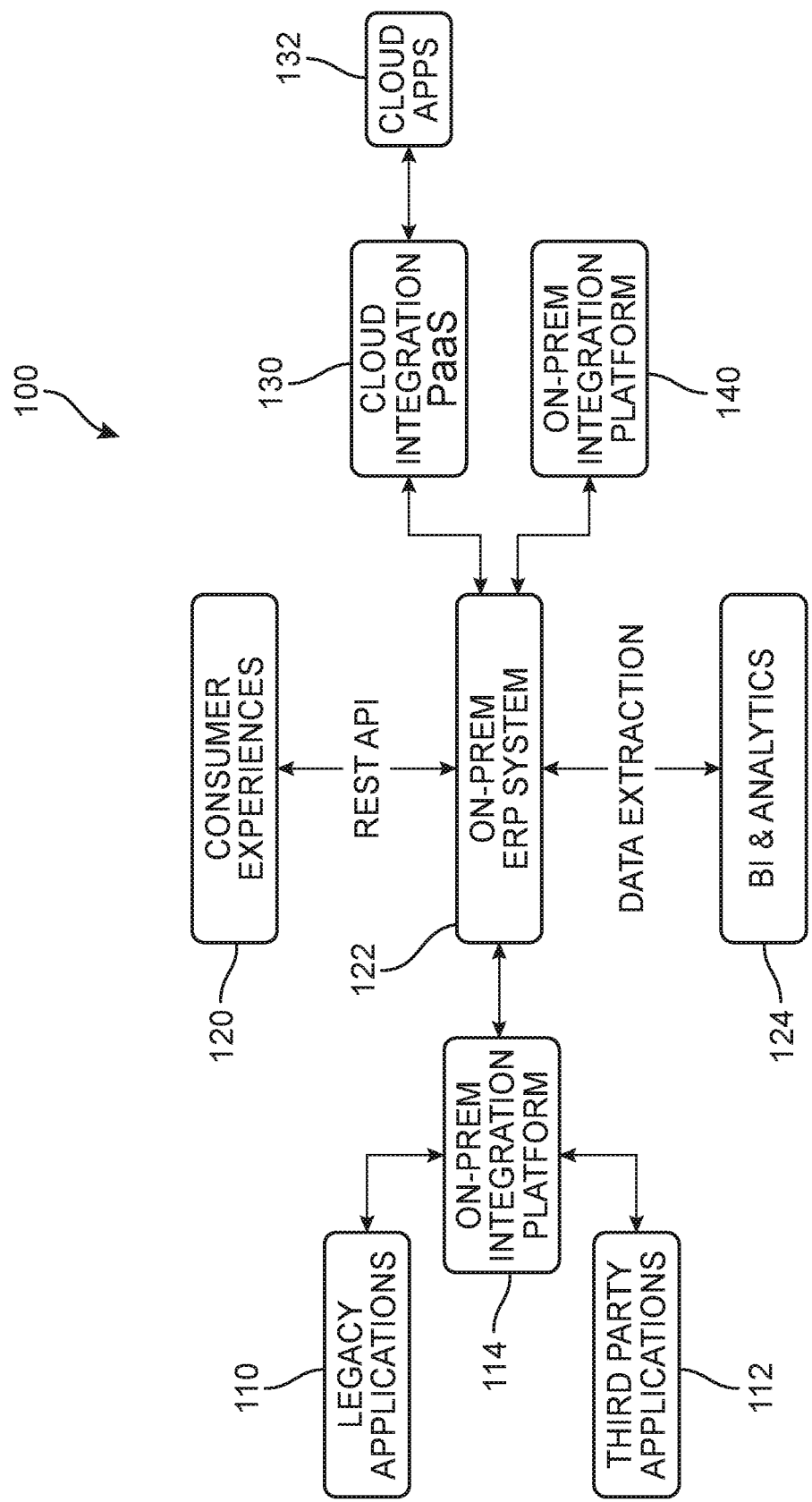
FIG. 1 is a schematic diagram of an embodiment of a hybrid computing environment.

Business entities and other enterprises may over time require data processing resources beyond those that are available in their on-premises computer networks (also referred to herein as local computing resources or a private cloud). For example, the entity may find that its own local computing resources provide only a limited amount of processing capability and data storage resources, and/or are not able to offer or host applications that have become desirable or necessary to their business. In response to such limitations, the entity may seek support and additional resources from an external cloud service provider (also referred to herein as a public cloud). For example, such a service may provide additional processing, storage resources, or specific application functionality on a temporary basis from the cloud computing service's data processing resources. Often, while some data processing resources will then be provided by a public cloud, the business will also continue to operate its own local computer network. Such a collaboration between public and private computing resources is known as hybrid cloud computing. However, onboarding and maintenance of the integration process between the two types of computing resources can be fraught with challenges. Integrations often expose business networks to errors and security risks, particularly when the integration is initially launched.

The proposed systems and methods describe an intelligent hybrid cloud architecture and environment that offers significantly reduced deployment times with little to no deployment errors. The integration is highly automated and is configured to meet the specific needs of individual businesses. The system incorporates an artificial intelligence (AI) powered solution that is API-enabled and pre-integrated with system chatbots, while providing a secure, accelerated integration with available cloud ecosystems, such as but not limited to SAP C/4 HANA, SAP S/4 HANA, SAP Hybris Cloud, SAP CRM, and/or other ERP (Enterprise Resource Management) type data management and/or integration platform suites. In addition, in some embodiments, the system provides an AI-powered dashboard that offers a high degree of processing visibility to its users and facilitates cloud integration lifecycle management. The proposed solution is able to analyze business processes, and derive and build deep insights toward the enterprise cloud integration, improving security, design, and performance of the hybrid architecture. In addition, the configuration methodology of the proposed solution enables a real-time, automated, and business process driven cloud solution setup, maintenance, and automated self-healing, providing significant benefits to enterprises. This type of architecture is flexible, and can be adapted for use in a variety of configurations.

As will be discussed in detail below, aspects of the proposed systems and methods may be used to support the integration between legacy on-prem applications with cloud computing platforms and services. Generally, on-premises systems refer to software and technology that are located within the physical confines of an enterprise, often in the company's data center, as opposed to running remotely on hosted servers or in the cloud. This arrangement is also referred to as "on-premise" or simply "on-prem", and represents the more traditional method for working with enterprise software, typically requiring a software license for each server and/or end user that will be working with the software. By installing and running software on hardware located within the premises of the company, business end-users have physical access to the data and can directly control the configuration, management, and security of the computing infrastructure and data.

However, as noted above, companies now rely heavily on cloud and other SaaS (Software as a Service) applications in addition to their on-premise and legacy systems in order to achieve their business goals. Businesses discover that costs associated with managing and maintaining the on-premise environments can run exponentially higher than a cloud computing environment, as such environments require in-house server hardware, software licenses, integration capabilities, and IT employees on hand to support and manage potential issues that may arise. In contrast, cloud computing allows the business to obtain the same services from a third-party provider, thereby allowing companies to pay on an as-needed basis and effectively scale up or down depending on overall usage, user requirements, and the growth of a company. A cloud-based server utilizes virtual technology to host a company's applications offsite. There are little to no capital expenses, company data can be backed up regularly, and companies generally only pay for the resources they use. Furthermore, cloud computing offers nearly instant provisioning whereby any new software that is selected is ready to use immediately once a company has subscribed. However, businesses may wish to maintain some or all aspects of their on-premises environments while taking advantage of the features provided by a cloud computing environment.

The proposed systems and methods offer an intelligent hybrid cloud solution that may be implemented to facilitate this type of collaboration. For purposes of this application, a hybrid cloud solution refers to the combination of a private cloud with the use of public cloud services where one or several touch points exist between the environments to create a unified computing environment. Thus, if a business uses a public development platform that sends data to a private cloud or a data center-based application, leverages a number of SaaS applications and moves data between private or data center resources, and/or implements business processes designed as a service that can connect with external environments as though they were a single environment, the business is employing a hybrid cloud solution.

Furthermore, cloud integration refers to the process of configuring various application programs to access and share data in cloud, also known as iPaaS (Integration Platform as a Service). However, while hybrid cloud solutions offer significant benefits, the process of integration is commonly recognized as a stumbling block in adoption of the solution. Some cloud integration challenges include security, scalability and elasticity, and monitoring and management. The proposed systems offer a cloud integration solution that is robust enough to authenticate and authorize the access to resources, in the cloud as well as on-premises. In addition, the integration solution is capable of encrypting and storing the data, and provides a secure means of connecting the cloud to the organization without removing the firewall. The proposed integration solution is also flexible enough to support various integration flows which move in both directions (i.e., across the cloud and the organization). Finally, companies often wish for visibility of the architecture while avoiding the burdens of upgrading and maintaining applications. The proposed integration solutions provide transparent monitoring capabilities as well as easy-to-implement control options of the performance attributes and the information flows of the system.

The disclosed systems and methods are configured to facilitate and support integrations for hybrid computing environments. Referring to FIG. 1, for purposes of introduction, an example of a hybrid environment ("environment") 100 is depicted. Environment 100 includes a set of computing systems, e.g., on-prem systems, including but are not limited to, legacy applications 110 and third-party applications 112. The on-prem systems connect via a network to a first On-Prem SOA middleware tool for service-oriented processes integration ("first integration layer" 114), such as but not limited to an SAP-type PO (process orchestration). Generally, the network includes one or more wired and/or wireless networks. For example, a network may include a cellular network (e.g., a long-term evolution (LTE) network, a code division multiple access (CDMA) network, a 3G network, a 4G network, a 5G network, or another type of cellular network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. The number and arrangement of devices and networks can vary widely. In practice, there may be additional devices and/or networks, fewer devices and/or networks, different devices and/or networks, or differently arranged devices and/or networks over the life of a business.

The first integration layer 114 also serves as an interface between the on-prem system and a Multi-Channel Foundation (MCF) or other web-mobile integration middleware solution layer ("integration solution") 122 such as an On-Prem ERP system that allows companies to interact with their customers through different communication channels, such as, for example, the Web (online self-services), mobile applications, social networks, IVR, and/or e-mail (see consumer experiences 120), or REST APIs such as but not limited to OData (open data protocol) Services. In different embodiments, the integration solution 122 offers companies the ability to monitor and optimize their telecommunications network, as well as provide supply chain and retail optimization, fraud detection and security, forecasting and profitability reporting, and energy use optimization and monitoring. In one non-limiting example, the integration solution 122 encompasses an ERP solution for utilities, which provides users with tools for usage data collection, data management, customer billing, product development and management, case management, payments, credit and collections, and/or accounts payable. In one non-limiting example, such an ERP solution can refer to SAP S/4 HANA for utilities. In other embodiments, different or additional integration solutions may be used that process structured data from relational databases and applications and other systems rapidly, both SAP and non-SAP, such as but not limited to enterprise data management (EDM), BDEX, IDEX, TORCH, etc. The extracted data is stored directly in memory and further processed by business intelligence (BI) and analytics services 124, generating information about data access, data management, security, operations, and/or governance and integration. Thus, data can be accessed quickly in real time by the applications that use or rely on the integration solution 122.

In some embodiments, the integration solution 122 is configured to communicate with additional integration layers. In FIG. 1, integration solution 122 exchanges data with a second integration layer 130 comprising a cloud integration platform as a service (PaaS)) (e.g., SAP CPI) which further communicates with cloud-based services and apps 132. In different embodiments, the integration solution 122 can exchange data with a third integration layer 140 (e.g., another On-Prem Integration Platform) to communicate with other cloud apps.

Figure 2:
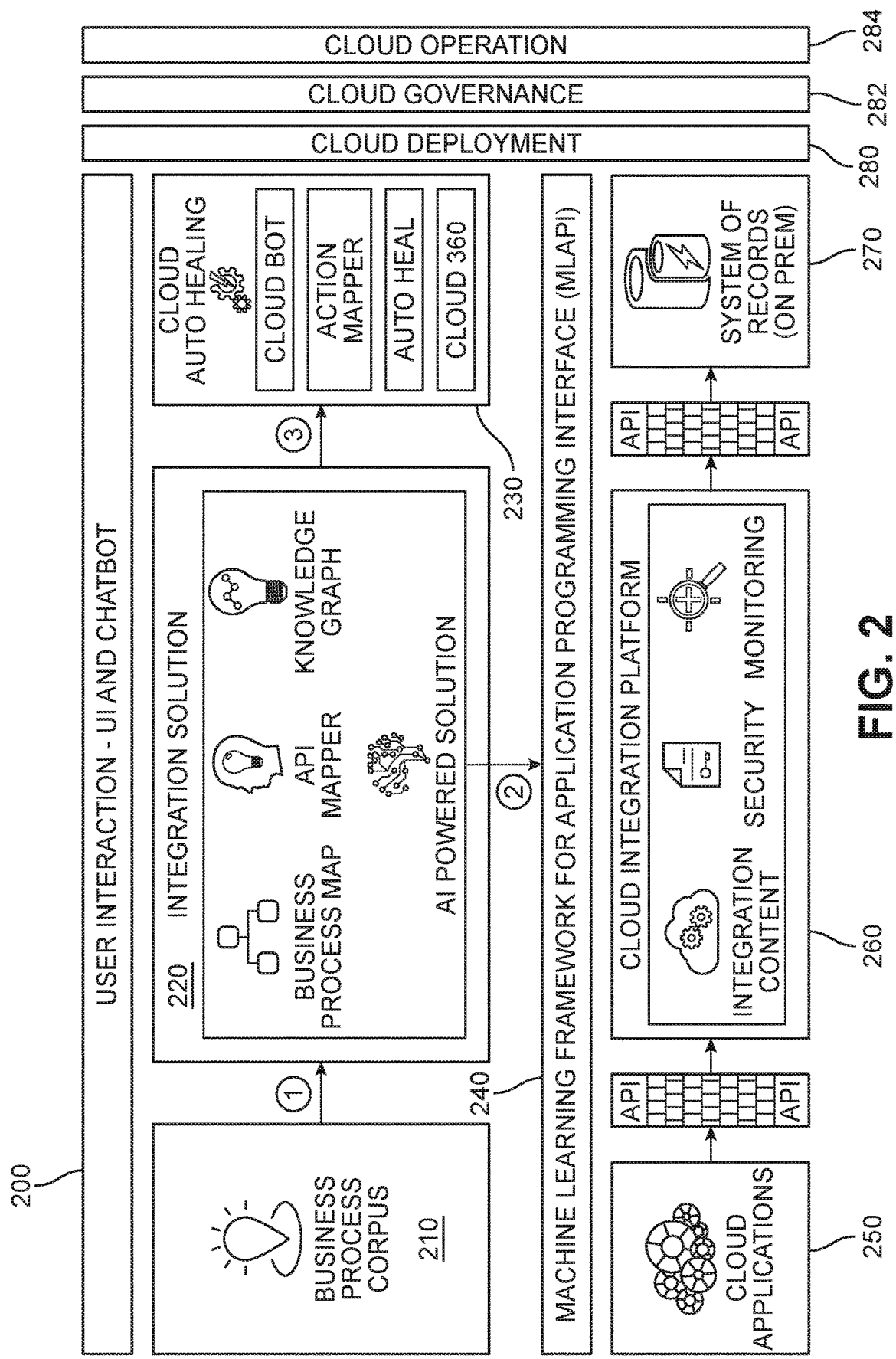
FIG. 2 is a schematic diagram of an embodiment of a cloud platform solution for intelligent cloud and on-premise hybrid deployments.

Referring now to FIG. 2, an overview of an embodiment of an integration environment 200 for implementing the systems and methods disclosed herein is depicted. The integration environment 200 illustrates an example of human and AI teaming to provide an intelligent user interaction experience and cloud solution configuration. In this example, the business user can select cloud processes and/or systems which need to be configured, integrated and deployed through an interactive Chatbot or UI (user interface).

As a general matter, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. Voice control can also be used to actuate options. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Figure 8:
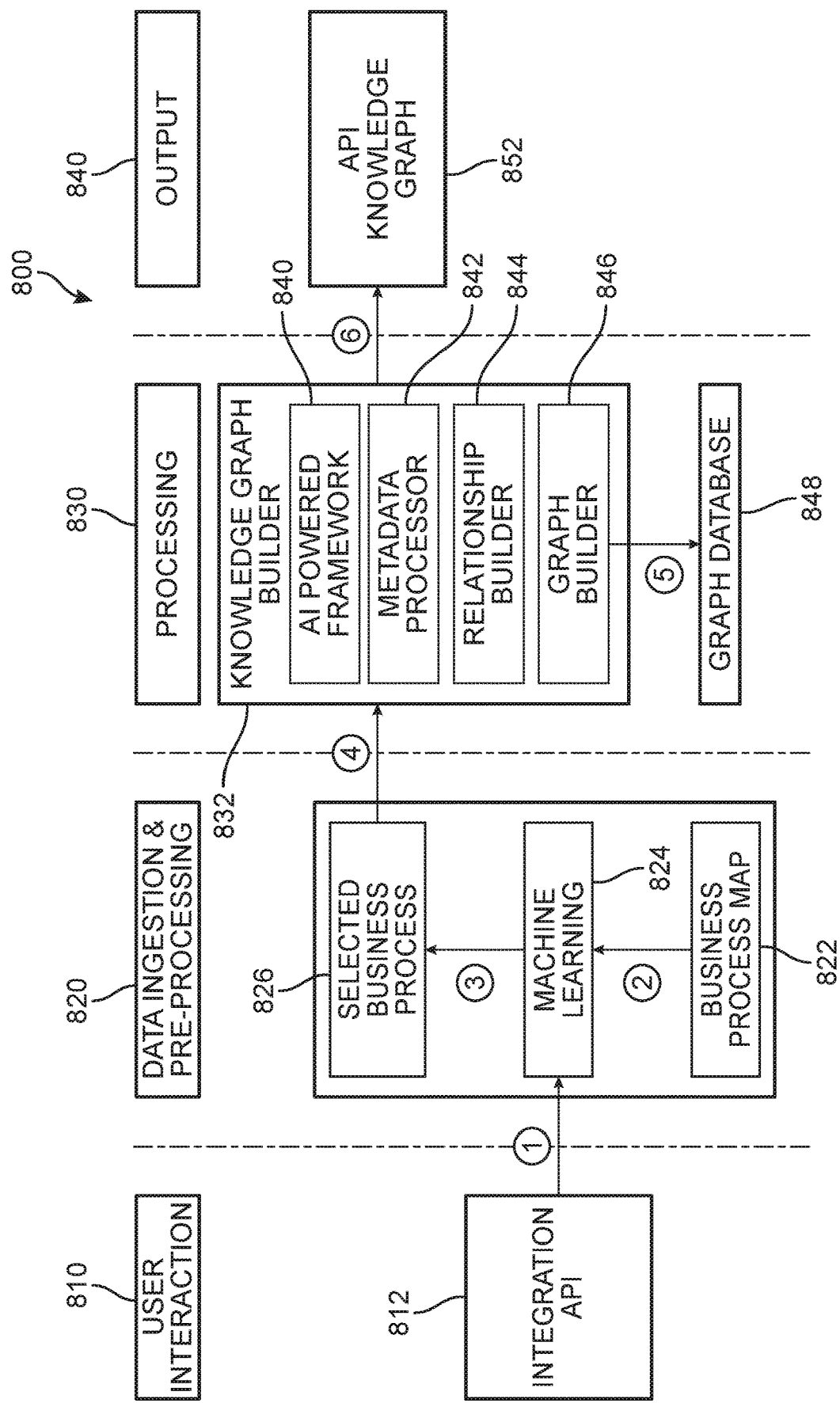
FIG. 8 is a schematic flow diagram of a process of generating an API knowledge graph, according to an embodiment.

The information collected about the business process (referred to as business process corpus 210) is conveyed to the cloud integration solution 220 in a first stage, and a business process map is generated representing the integration flow for each business process (i.e., each node of the business process is mapped with a target attribute), and a knowledge graph will be extracted from the integration flow which will identify the key elements needed for configuring the solution (see FIG. 8). Furthermore, user requirements and needs will be classified using an intelligent machine learning module or AI powered solution. The output from the processing of cloud integration solution 220 will be conveyed to both a machine learning framework for APIs (MLAPI) 240 in a second stage, as well as a cloud auto-healing module 230 in a generally concurrent third stage. The cloud auto-healing module 230 provides both healing and end to end monitoring, as well as a cloud bot for validating the solution. In addition, an action mapper maps the appropriate action for each user need. A solution configuration and deployment BOT can automatically be executed to configure and deploy the solution. The MLAPI 240 receives information from cloud applications 250 through one or more APIs that is shared with a cloud integration platform 260 that supplies integration content, security, and monitoring features. The collected information is submitted to a local system of records (on-prem) 270 via one or more APIs. Each of these stages can be understood to be representative of various facets of cloud deployment 280, cloud governance 282, and cloud operation 284 for the solution.

Figure 3A:
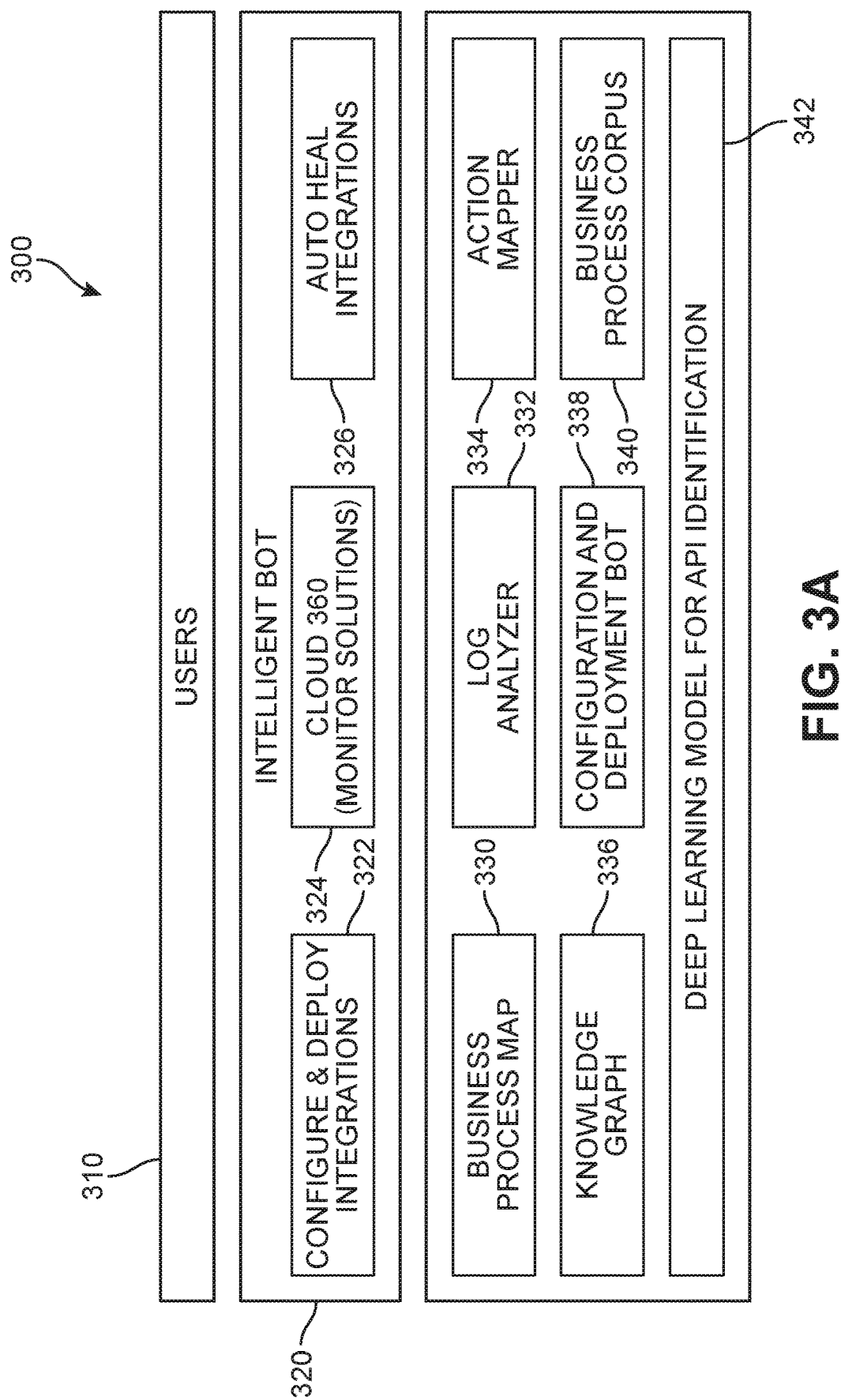
FIGS. 3A and 3B are schematic diagrams of an embodiment of an architecture for a hybrid computing system.
Figure 3B:
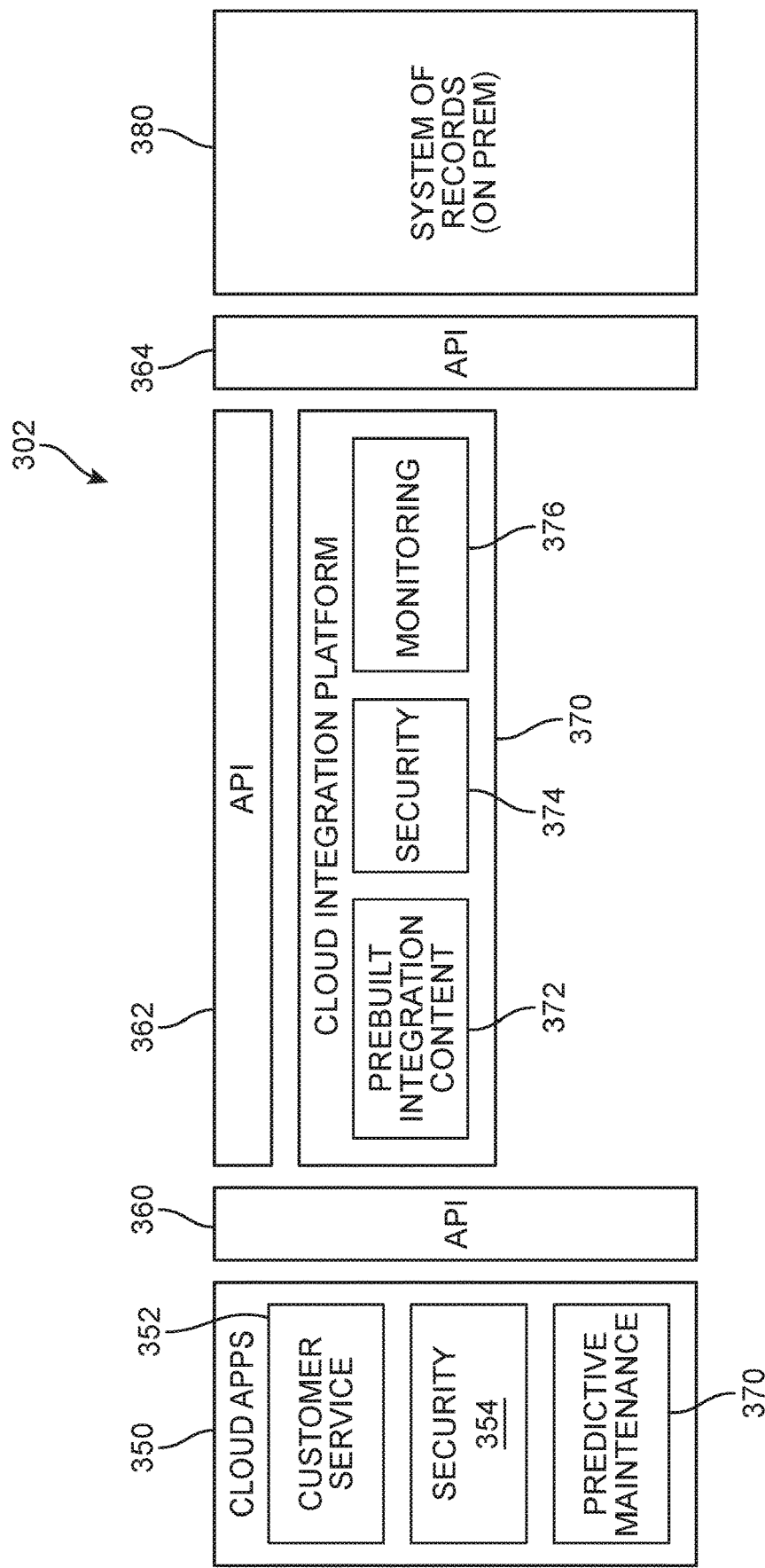

In FIGS. 3A and 3B, one embodiment of a technical architecture (comprising a first portion 300 and second portion 302) for cloud integration solution(s) is presented. The architecture 300 and 302 can include a plurality of interconnected components that serve a hybrid cloud computing system. In FIG. 3A, the architecture can be seen to include a user-side system 310 for which the integration solution is being implemented. As a general matter, user-side systems refer to one or more devices capable of receiving, generating, storing, processing, and/or providing information associated with analyzing data related to resource utilization of a cloud computing resource in a cloud computing environment. For example, user systems may include a desktop computer, a mobile phone (e.g., a smart phone or a radiotelephone), a laptop computer, a tablet computer, a gaming device, a wearable communication device (e.g., a smart wristwatch or a pair of smart eyeglasses), or a similar type of device. A user system can run an HTTP client, e.g., an internet browsing program, allowing a user (e.g., subscriber of the cloud computing services) to access, process and view information, pages and applications available to it from over a network. Each user system also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms, applications and other information provided by cloud computing resources or other systems or servers.

Figure 9:
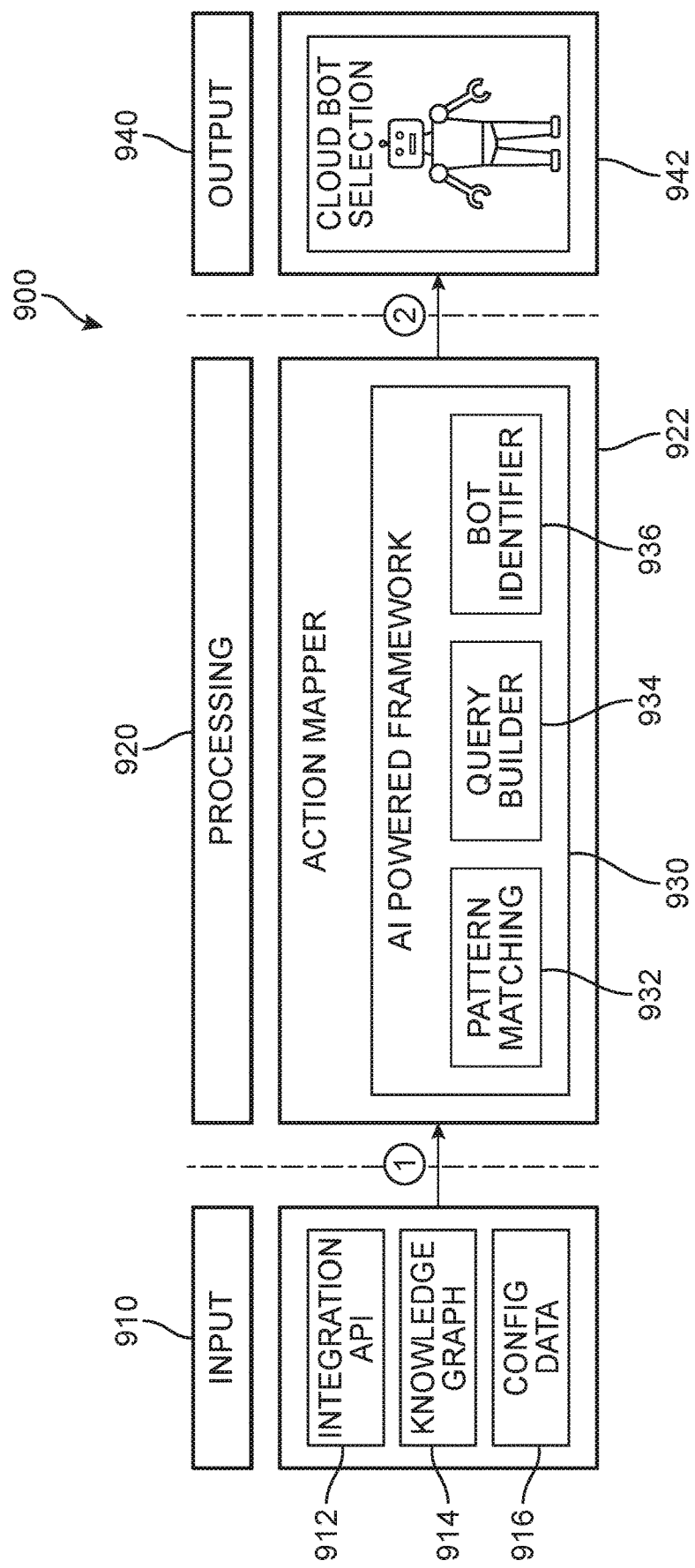
FIG. 9 is a schematic flow diagram of a process of selecting a cloud bot, according to an embodiment.

Information from user-side system 310 can be shared with an intelligent bot ("bot") 320, which will be discussed in greater detail with reference to FIG. 9. In general, the bot 320 represents the use of cloud-based software to perform high-volume, repeatable tasks on computer systems. More particularly, bots can be configured to capture and interpret existing applications to, for example, process a transaction, manipulate data, trigger and/or execute responses, and/or communicate with other systems. Furthermore, bots can adapt to changing circumstances, exceptions, and new situations. Once a bot has been trained to capture and interpret the actions of specific processes in existing software applications, the bot performs its assigned tasks autonomously. Typically, bots are provided via an RPA (robotic process automation) platform. Some non-limiting example RPA platforms include Automation Anywhere™, Blue Prism™ C

, and UiPath™. In some examples, an RPA platform provides a set of tools (e.g., bot development tools, bot management tools), libraries, and runtime environments for bots. In some examples, a bot can include one or more data objects, and logic that encodes a process (or portion of a process) that the bot is to perform. A bot interacts with one or more applications (i.e., computer-executable programs) to perform one or more jobs. For example, a data object of a bot can be connected to a user interface (UI) of an application (e.g., browser-based HTML interfaces, MS Windows™ interfaces, mainframe terminal interfaces, Java-based interfaces, etc.), and the data object executes one or more actions using the UI. For example, a data object can execute actions to log into an application, enter data, retrieve a result, and log off. In some examples, a data object includes an application model, and one or more actions. For example, the application model is specific to an application that the bot is to interact with, and exposes elements of the UI of the application. Thus, the one or more actions include actions that the data object can perform with the application. As shown in FIG. 3A, the bot 320 will be selected to perform integration operations including but not limited to configuring and deploying integrations 322, monitoring solutions 324 (see FIG. 10), and providing auto-heal functions 326 (see FIG. 10) that generate automatic observations and reward functions directed to the health of the integration(s).

Figure 5:
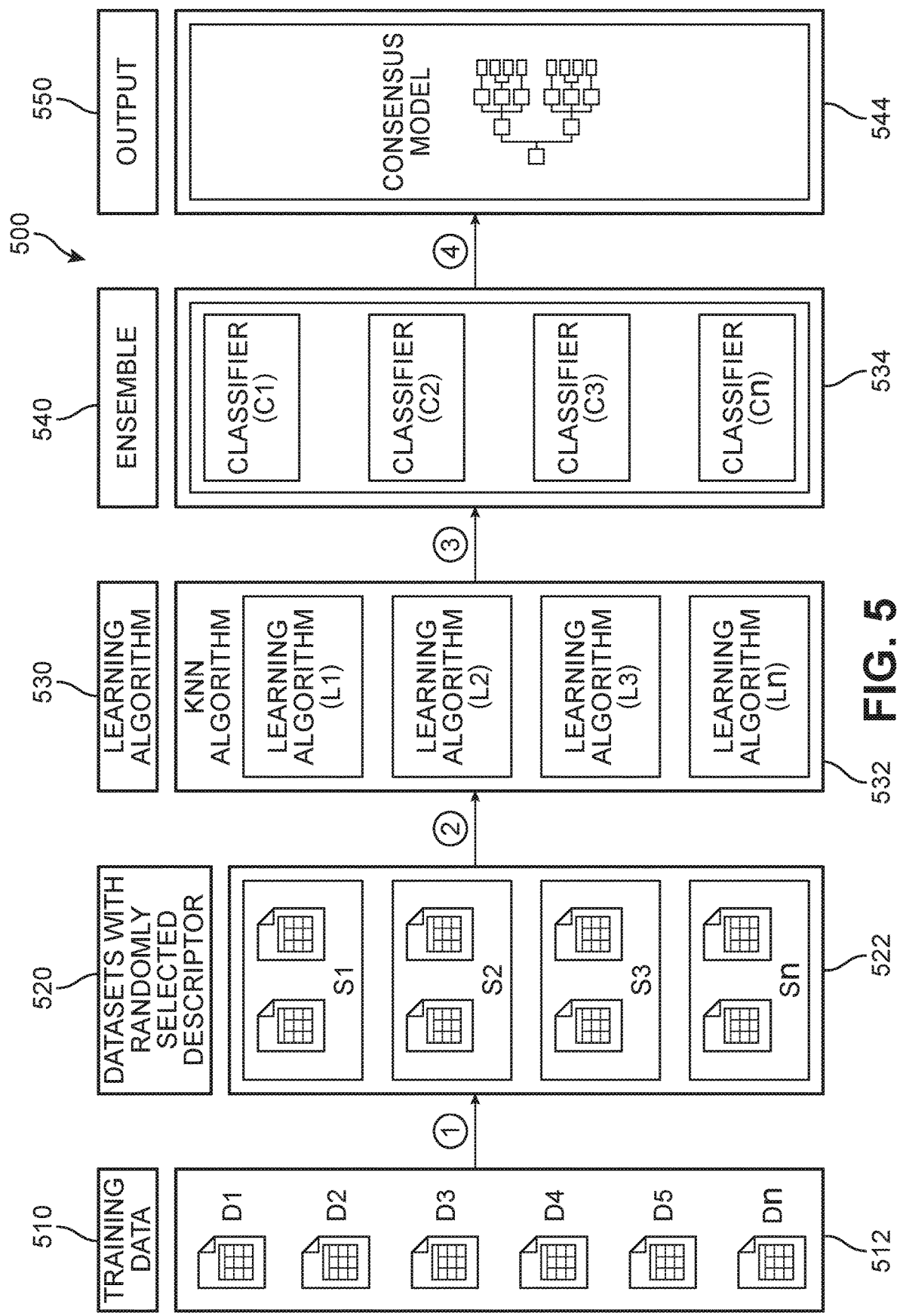
FIG. 5 is a schematic flow diagram of an ensemble machine learning algorithm for mapping features to a target flow in a business process, according to an embodiment.
Figure 6:
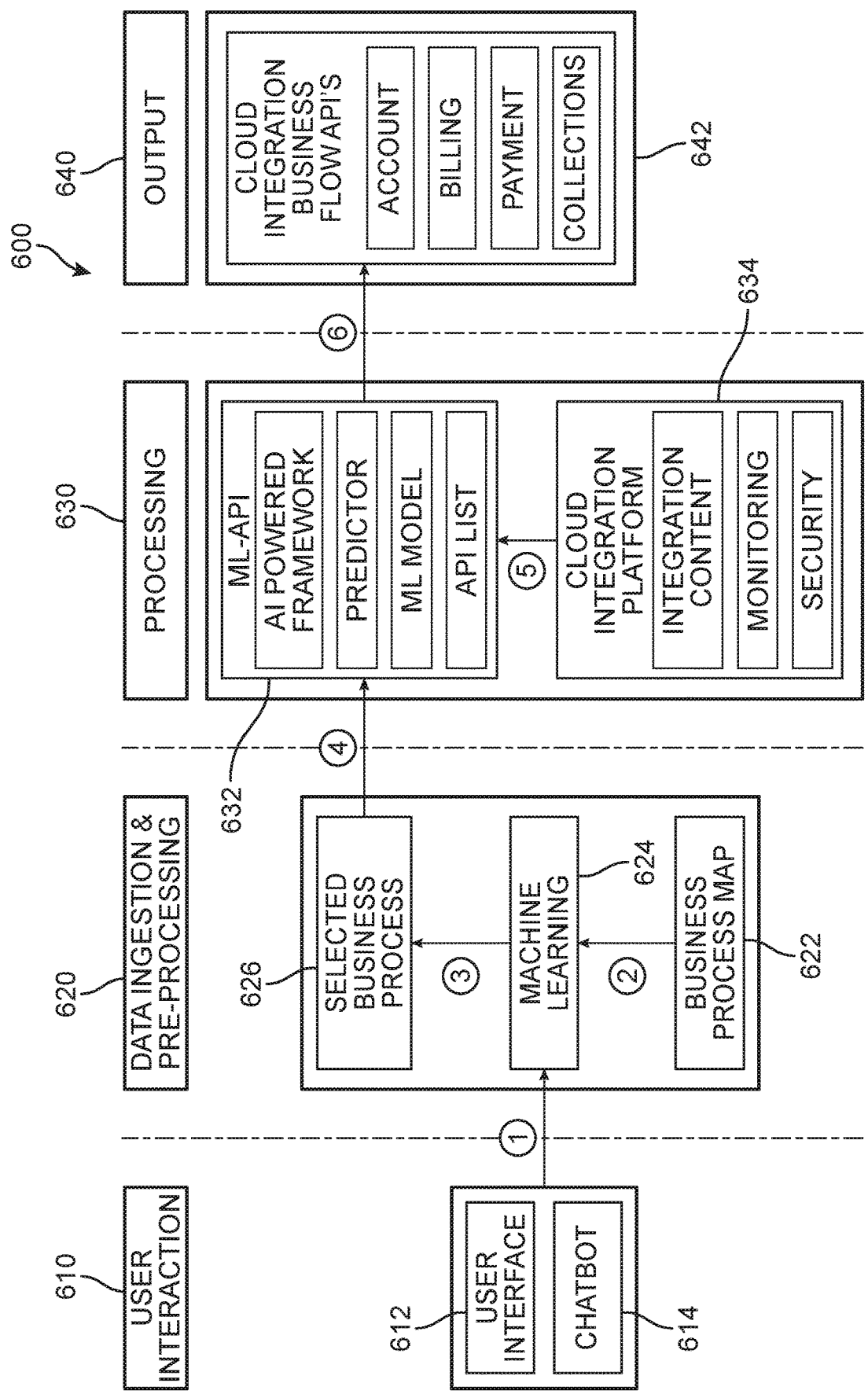
FIG. 6 is a schematic flow diagram of a machine learning framework for API identification, according to an embodiment.
Figure 7:
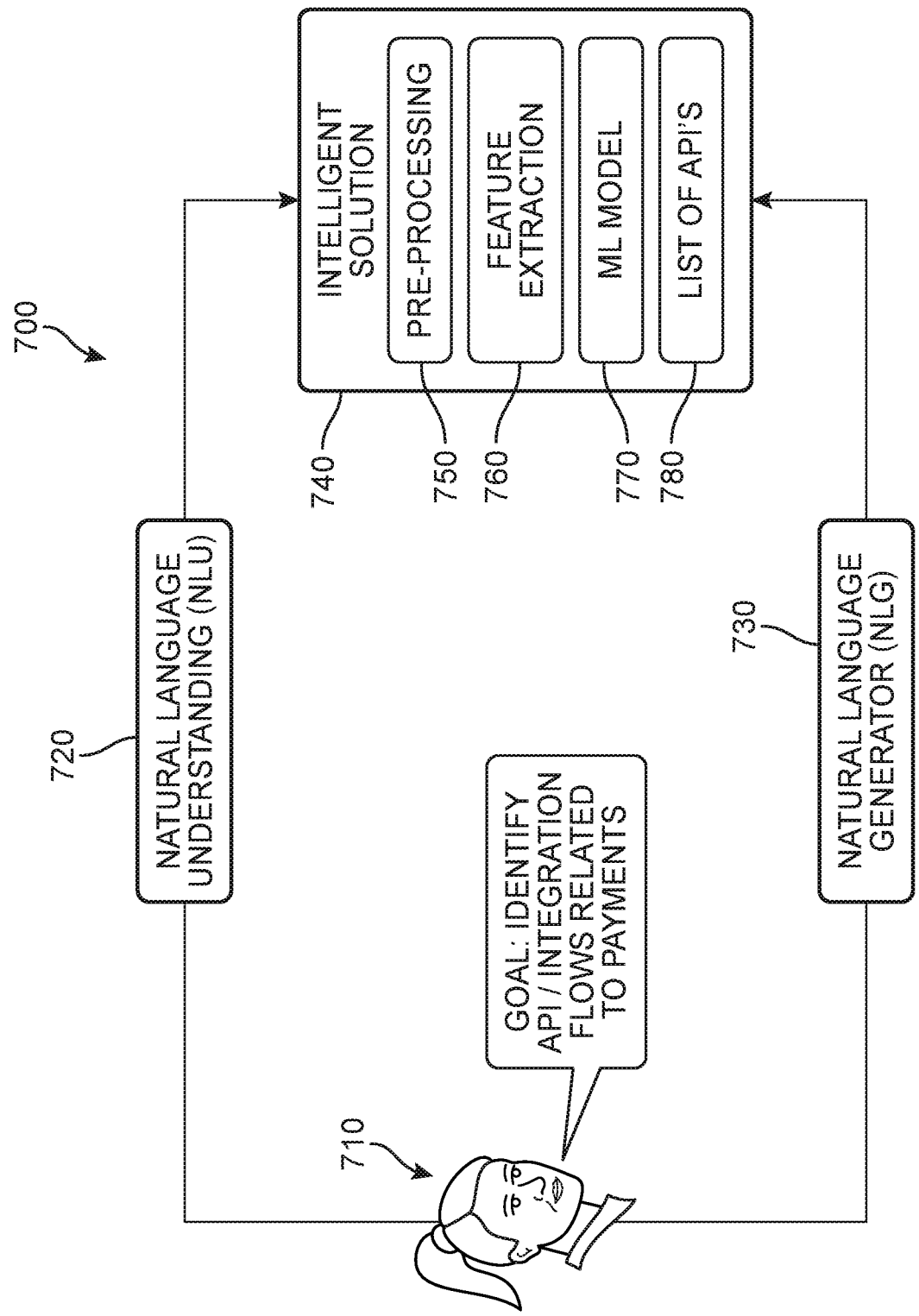
FIG. 7 is a schematic diagram of a high-level flow for configuring a specific business process, according to an embodiment.

In addition, the architecture includes a set of technologies, protocols and standards used to facilitate the remote management of user-side system 310, including but not limited to a business process map 330 of API using machine learning (see FIGS. 4 and 5), a log analyzer 332, an action mapper 334 (see FIG. 9), a knowledge graph 336 (see FIG. 8), a configuration and deployment bot 338 (see FIG. 9), a business process corpus 340 (see FIG. 4), and a deep learning model for API identification 342 (see FIGS. 6 and 7).

The architecture continues in FIG. 3B, further including cloud applications ("apps") 350 comprising tools providing, for example, customer service 352, security 354, and predictive maintenance 356 apps for the hybrid computing environment. The components of FIG. 3A communicate with a cloud integration platform ("platform") 370 via a first API 362. Similarly, the cloud apps 350 communicate via a second API 360 with the platform 370, and on-prem records environment 380 communicates with the platform 370 via a third API 364. The platform 370 supports prebuilt integration content 372, additional layers of security 374, and monitoring 376 for the hybrid computing environment.

Figure 4:
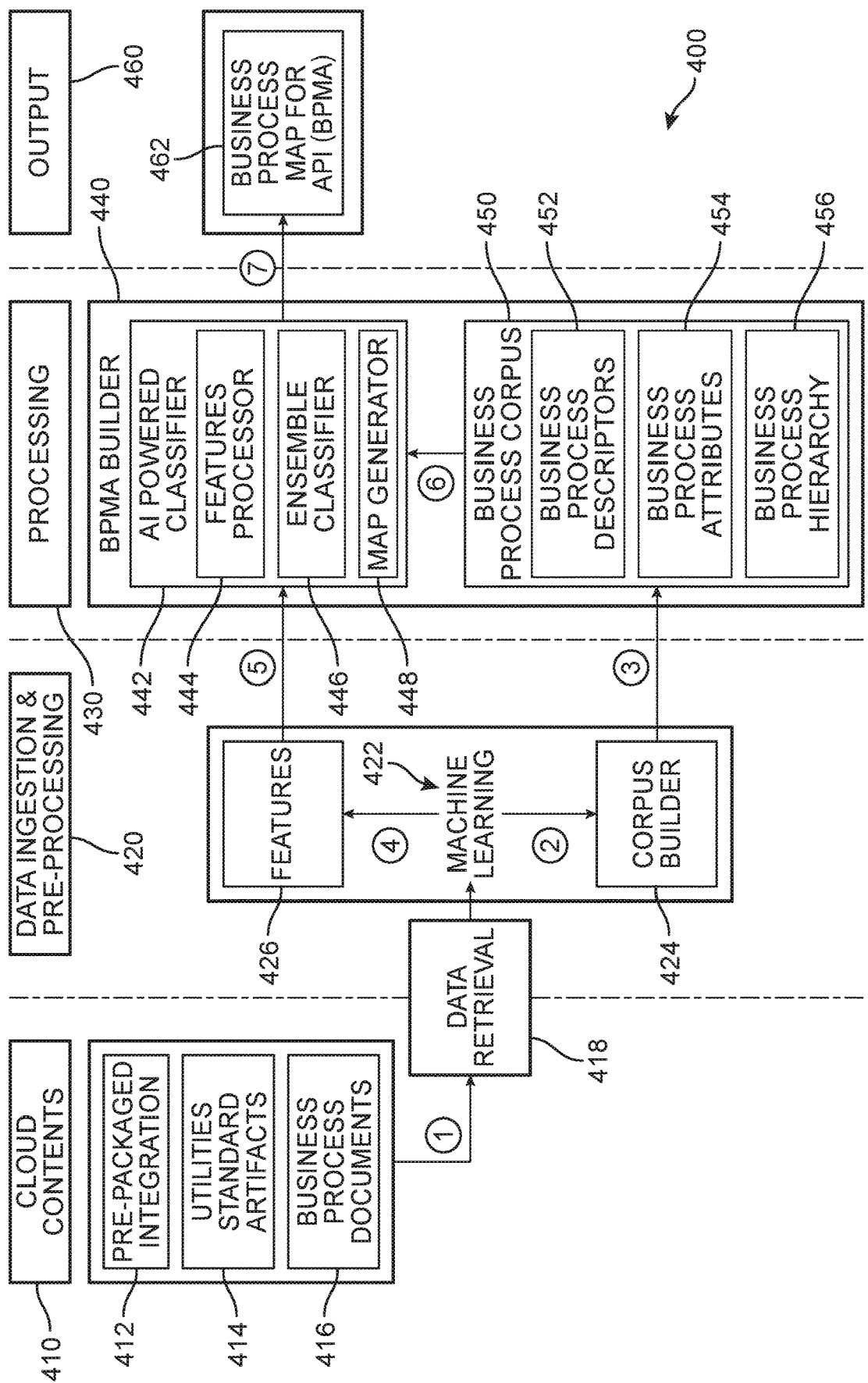
FIG. 4 is a schematic flow diagram of a business process map for APIs, according to an embodiment.

Components of the cloud integration solution introduced in FIGS. 3A and 3B will now be discussed in greater detail with reference to FIGS. 4-10. In FIG. 4, a flow diagram for generation of a business process map for APIs ("BPMA flow") 400 is presented. The BPMA flow 400 includes a first module 410 which represents various cloud integration contents (e.g., utilities business process documents 416, standard artifacts 414 retrieved by the application, prepackaged integration content 412, etc.) that are delivered to a second module 420 for data ingestion and pre-processing. Generally, pre-packaged integration content 412 refers to components of cloud solutions configured to enable integrations with various on-prem systems. These contents are usually built using standard cloud middleware platforms and can be easily customized or deployed in a company's landscape. In addition, utilities standard artifacts 414 contain detailed descriptions and metadata about the prepackage integration content 412. Finally, business process documents 416 include low-level information related to the business model.

The contents of first module 410 are retrieved by and/or delivered by a data retrieval process 418 to a BPMA machine learning model 422 of second module 420, which processes the data for use by a corpus builder 424. The corpus builder 424 is an intelligent module which is designed to analyze, extract, and classify information from first module 410 to create a highly organized and structured business process corpus 450 which can be used during subsequent processes performed by the cloud solution. It should be appreciated that this process is substantially continuous, such that the business process corpus will be updated and enriched as new data is received.

In addition, BPMA machine learning model 422 will extract key information ("features") 426 from the prepackaged integration content 412 using natural language processing (NLP) techniques (see FIG. 5). These features 426, along with business process corpus 450, are delivered to an AI powered classifier 442 in a third module 430 for BPMA (business process map for APIs) builder processing. The business process corpus 450 is collected and structured as a set of business process descriptors 452, business process attributes 454, and a business process hierarchy 456 that may be used for business process analysis and classification. In a next stage, a features processor 444 performs various preprocessing techniques to process the features 426 and business process corpus 450 and an ensemble classifier 446 combines the diverse set of individual models to fine-tune the stability and predictive power of the larger model. As a general matter, an ensemble method refers to a technique that creates multiple models and then combines them to produce improved results. Ensemble methods typically produce solutions with a higher accuracy than a single model would. For example, an ensemble Random Subspace KNN classifier may be used to organize the contents under the appropriate business process, sub-process, and category. This process is repeated for each set of features until all features have been classified. Finally, a map generator 448 generates a BPMA 462 based on the output data from the machine learning model, representing a novel framework designed to present a hierarchical relationship between the designated business process and the APIs associated with those processes.

For purposes of illustration, one non-limiting example of a machine learning algorithm that may be applied to generate the BPMA as described in FIG. 4. As a general overview, it can be understood that features are first extracted from the data sources by the intelligent solution, and these features are preprocessed by various NLP preprocessing techniques to prepare the features for ingestion by the classifier. The pre-processing techniques can include steps of tokenization of the features, removal of a list of stop words (such as "and", "of", and "the"), lemmatization of the features, removal of punctuation, as well as removal of features with two or fewer characters and features with 15 or more characters. The features can then be mapped to a target flow in the business process tree using an ensemble machine learning algorithm (see FIG. 5), such as a nearest neighbor classifier based on the random subspace algorithm.

Further details about the operation of the BMPA model will now be presented. In a first step, the algorithm receives input comprising pre-packaged integration contents ($P_i$), industry artifacts ($A_i$), and business process documents ($B_i$). In a first step, business process features set (k) is extracted from the pre-packaged integration contents ($P_i$), industry artifacts ($A_i$), and business process documents ($B_i$). In a second step, for each feature k, a Boolean value is determined for each pair ($k_i$, $C_j$)∈K×C where K is a domain of the feature and C={$c_1, c_2, \ldots, c_n$} is a set of predefined business process areas, thereby approximating the unknown target function as a function that describes how the features should be classified by means of a function φK×C→{0,1} referred to as the classifier. The second step is repeated to approximate the business sub process and sub-area, ending when the requisite information is obtained to create the business process map and BMPA.

An example of an ensemble learning process 500 is illustrated with respect to FIG. 5. The ensemble learning process 500 applies a random subspace method for reducing the correlation between estimators in an ensemble by training the algorithm on random samples of features rather than the entire feature set. In FIG. 5, a number of training points and features are submitted as training dataset 510 (i.e., data 512 comprising D1, D2, D3, D4, D5, ... Dn) and structured as training datasets with randomly selected descriptors 520 (i.e., datasets 522 comprising S1, S2, S3, Sn). A number of individual models are selected for the ensemble to supply to a learning algorithm 530. For example, a KNN algorithm classifies individual models 532 as L1, L2, L3, ... Ln, and for each individual model $L_i$, chooses (ni∈n) to be the number of input points for $L_i$. In addition, for each individual model, a training set is created by choosing $D_i$ features from training data 510 to replace and train the model. The outputs of the individual models 532 are classified by ensemble classifier 540 (i.e., classifiers 534 C1, C2, C3, ... Cn) and combined by majority voting to generate a consensus model 544 as output 550.

Once a set of business processes and corresponding sub-processes, as well as business areas and corresponding sub-areas, have been identified by the BPMA machine learning algorithm as discussed above to generate a business process map, a second machine learning algorithm will be utilized for determining which API framework should be implemented. Referring now to FIG. 6, a flow diagram for identification of APIs ("API flow") 600 that should be deployed to enable an integration is presented. In a first stage 610, a user provides input to the system requesting a configuration for a specific business process via a user interface 612 and/or chatbot 614 serving as an access point to the integration service. This input, along with a business process map 622 that had been previously generated for this enterprise, is submitted to a business process selection machine learning model ("BPMS model") 624 in a second stage 620 ("Data ingestion and pre-processing"). The BPMS model 624 evaluates the request and corresponding business map to select a specific business process 626 to which the request is directed. In a third stage 630 ("processing") the selected business process 626 and request are received by an AI-powered model framework of a machine learning framework for API identification (ML-API) 634, which is configured to identify the API associated with a particular business process from the BPMA. The AI-powered model framework also receives data from a cloud integration platform 634, which can include integration content, monitoring data, and security information. As a general matter, the cloud integration platform 634 refers to the system of tools and technologies that connects various applications, systems, repositories, and IT environments for the real-time exchange of data and processes. Once combined, the data and integrated cloud services can then be accessed by multiple devices over a network or via the internet.

The AI-powered framework receives these datasets (herein referred to as a predictor) and feeds the predictor into an ML-API machine learning model to predict or determine the API that is appropriate or suitable for the request and selected business process. The API will be selected from an API list, which is a list of application programming interfaces that can be associated with the enterprise. The selected API is then output in a fourth stage 640 for use as part of cloud integration business flow APIs 642 for the enterprise. The selected API can, for example, provide tools to the business for accounting, billing, payments, and/or collections, depending on the user's request.

Further details about the operation of the BMPS model will now be presented. In a first step, the algorithm receives input comprising a user request for configuring a specific business process. Pre-processing is performed of the request and the previously generated business process map, thereby extracting a business process features set k. A regression algorithm is then used to approximate the functional area for each feature k of features set k. In addition, for each feature k and identified functional area, the BMPS model will approximate a functional sub area using a cognitive operation, and use a second cognitive operation to approximate the business process using the feature, functional area, and sub area. A third cognitive operation is then used to approximate the business sub process for each feature. A tree or business process navigation path using the approximated values is then created. The validity of the navigation path in the business process map is ascertained by reference to the business process corpus or repository. Based on the navigation path, the associated API for the selected business sub process is identified using a cognitive operation. Finally, the API list or integration flow needed for the requested business process is created and output by the model.

For purposes of illustration, one non-limiting example of a process for identifying the API needed for a specific business process and request is depicted with reference to FIG. 7. In FIG. 7, a user 710 submits a desired goal or request ("Identify API/Integration Flows Related To Payments"). The system applies natural language understanding (NLU) systems 720 and a natural language generator (NLG) 730 to interpret and respond to the request. As a general matter, natural language understanding systems interpret the word sequences of user utterances. For example, natural language understanding systems are used by task-oriented virtual agents to communicate with human users in a natural language and work with or help the users in performing various tasks. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers. Natural language understanding systems help virtual agents identify what the human user desires. For example, the natural language understanding system may have an intent model that finds the user's intent from the user's utterances. Then, a downstream component of the virtual agent, such as a dialogue manager, can use the intent to identify how to respond to the human user.

Thus, in some cases, the user's request is first processed by an automatic speech recognition system to convert spoken words into a string, or sequence, of words that can be used by systems downstream and then passed to natural language understanding systems 720 to extract the meaning of the string of words. More specifically, in some embodiments, the natural language understanding system takes in a word sequence as input and outputs the extracted meaning of a word sequence for a dialogue module to use in order to respond to the request in an appropriate manner. The response is converted into a natural language response by natural language generator 730. It may be appreciated that the cycle represented by FIG. 7 may be repeated after each customer request (or other utterance) such that virtual agent provides a response and continues a conversation with the customer until the customer goals have been met.

In this example, the natural language systems (NLU 720 and NLG 730) determine the user's goal based on the request and selects a specific business process from the business process map for API. In this case, the terms "financial" and "payment" are used by the intelligent framework to select the appropriate APIs. For example, the inputs are pre-processed 750 to extract features 760 for input to BPMS machine learning model 770. The BPMS machine learning model 770 then identifies a list of APIs 780 that should be deployed to enable the integration as its intelligent solution 740.

In different embodiments, the APIs identified by the model can be used to generate an API knowledge graph. As a general matter, a knowledge graph may serve as a representation that captures the salient knowledge about a particular set of integration components. More specifically, the knowledge graph represents the relationship between various components in an API or integration flow (e.g., on-prem system, network, user role, customer type, Rest API adapter, Cloud app, SOAP adapter, etc.). A group of "nodes" in the graph can be extracted that each represent various metadata features associated with the same or similar components. Based on these classifications, the system can be configured to generate and present a knowledge graph comprising a plurality of these nodes. In addition, the nodes will be connected to other nodes by an "edge" line, also referred to herein as a transitional path or transitional edge. For example, a first node will be connected to a second node by a transitional path. The transitional path represents one or more instances where a first component associated with a first node has a relationship with another component associated with the second node, thereby depicting a communication or other link corresponding to a portion of the larger system. Thus, the knowledge graphs can convey in a single illustration a large collection of components and how they are interconnected. Furthermore, because knowledge graphs present connections (relationships) in the data, they readily accommodate the incorporation of new data items as they are added into the data pool. In addition, the meaning of the data is encoded alongside the data in the graph; for example, each node will provide information about the metadata features associated with that node. The information provided by a knowledge graph can be used by the system to develop and deploy an intelligent integration solution.

One embodiment of a process for generating an API knowledge graph ("API knowledge graph flow") 800 is depicted in FIG. 8. In a first stage 810 ("integration flow") an input comprising data representing the output from the API identification process (see FIGS. 6 and 7), herein referred to as integration API 812, is received by the system. The integration API 812 describes or includes the application programming interface(s) that enables integration between the Cloud and On-Prem system for the business. In a second stage 820 ("data ingestion and pre-processing), the integration API 812, along with a business process map 822 for the enterprise (see FIG. 4), is provided to a business process map selection machine learning model ("BPMS model") 824, that may be the same or differ from BPMS model 624 of FIG. 6). The BPMS model 824 outputs a selected business process 826 based on the integration API 812 and business process map 822 for submission to a knowledge graph builder component 832 in a third stage 830 ("processing").

The input is received by an AI powered framework 840 of the knowledge graph builder component 832. A metadata processor 842 utilizes an intelligent NLP module to process and extract metadata information from the integration API. The extracted metadata (API metadata) is then submitted to a relationship builder 844, which applies a machine learning model to structure the extracted metadata in preparation of building a knowledge graph from the API metadata. A graph builder 846 is then generated from the structured information using a knowledge graph machine learning model ("knowledge graph model"), which can be stored for later reference in a graph database 848. The knowledge graph builder component 832 then outputs an API Knowledge Graph 852 in a fourth stage 850 that represents the relationships between various entities or components in an API or integration flow.

Further details about the operation of the knowledge graph model will now be presented. In a first step, the algorithm receives input comprising the integration API or integration flow. The input is pre-processed to extract a metadata feature set m={m1, m2, . . . , $m_n$} using NLP techniques. For each metadata feature $m_i$, the associated parent nodes p={p1, p2, . . . , $p_n$} are identified using a cognitive operation which further involves, for each parent node $p_i$, identification of the relationship between the $p_i$ and $m_i$ and storing the identified relationship in the graph database. The graph creation for the API is then completed by plotting the relationships between parent nodes p={p1, p2, . . . , $p_n$} and metadata feature set m={m1, m2, . . . , $m_n$}. The validity of the knowledge graph is ascertained by reference to the business process corpus or repository, and the knowledge graph is then stored in the database and output by the model. This output can then be used to develop, configure, and deploy the subsequent integration solution. In other words, by generating intelligent insights about the proposed integration flow and the end-to-end dynamics of the desired environment, an integration solution can be provided that is fine-tuned to the needs and priorities of the users.

In different embodiments, outputs from the models described above can be used to determine an appropriate bot for executing the action(s) needed to appropriately respond to a user request and/or to execute a repair action. Referring to FIG. 9, an embodiment of a process for selecting a cloud bot ("cloud bot selection flow") 900 is depicted. In a first stage 910, input comprising integration API or integration flow 912, knowledge graph 914, and configuration data 916 is collected. Generally, the configuration data refers to user provided configuration data about the integrating systems (including both cloud and on-prem systems) such as but not limited to URLs, authentication methods, API-end points, certificates, credentials, etc.). This input is provided to an action mapper 922 in a second stage 920 for processing. The action mapper 922 refers to an intelligent solution comprising an AI powered framework 930 implemented to map the extracted configurable API data from the integration flow 912 and knowledge graph 914 to the user provided configuration data about the cloud system. For example, a pattern matching component 932 will map the knowledge graph 914 with the configuration data 916 using NLP techniques. The value map will then be provided to a query builder module 934 to build the final execution command. The execution command can be triggered through a bot to configure, deploy, and validate the integration solution. Finally, a bot identifier 936 selects an appropriate bot from a BOT repository to enable the execution of the command. Thus, in a third stage 940 a cloud bot 942 is selected for interfacing with the cloud system, on-prem system, and integration platform, and execute the command selected or created by the query builder.

Further details about the operation of the cloud bot selection model will now be presented. In a first step, the algorithm receives input comprising the integration API (A) and config data $C=\{c1, c2, \ldots c_n\}$ as well as knowledge graph $K=\{k1, k2, \ldots k_n\}$ as discussed with respect to FIG. 8. In a second step, for each element in $K=\{k1, k2, \ldots k_n\}$ and for each config data element of $C=\{c1, c2, \ldots c_n\}$, a value of either T is obtained ($k_i$, $c_i$) that represents a decision to map $k_i$ to $c_i$, or a value of F indicates a decision not to map the two elements. In addition, unknown target function $\emptyset$: $K \times C \rightarrow \{T, F\}$ is approximated using a classifier model. In a third step, for each element in $K=\{k1, k2, \ldots k_n\}$, the identified config data $c_i$ is used to build the query to be executed to set the knowledge graph element $k_i$ in the cloud platform. A cognitive operation is then used to identify the appropriate bot to be executed for updating and deploying the cloud integration component. Finally, the selected bot is executed to perform the operation in the cloud integration platform, resulting in the output of a cloud component deployment status.

Figure 10:
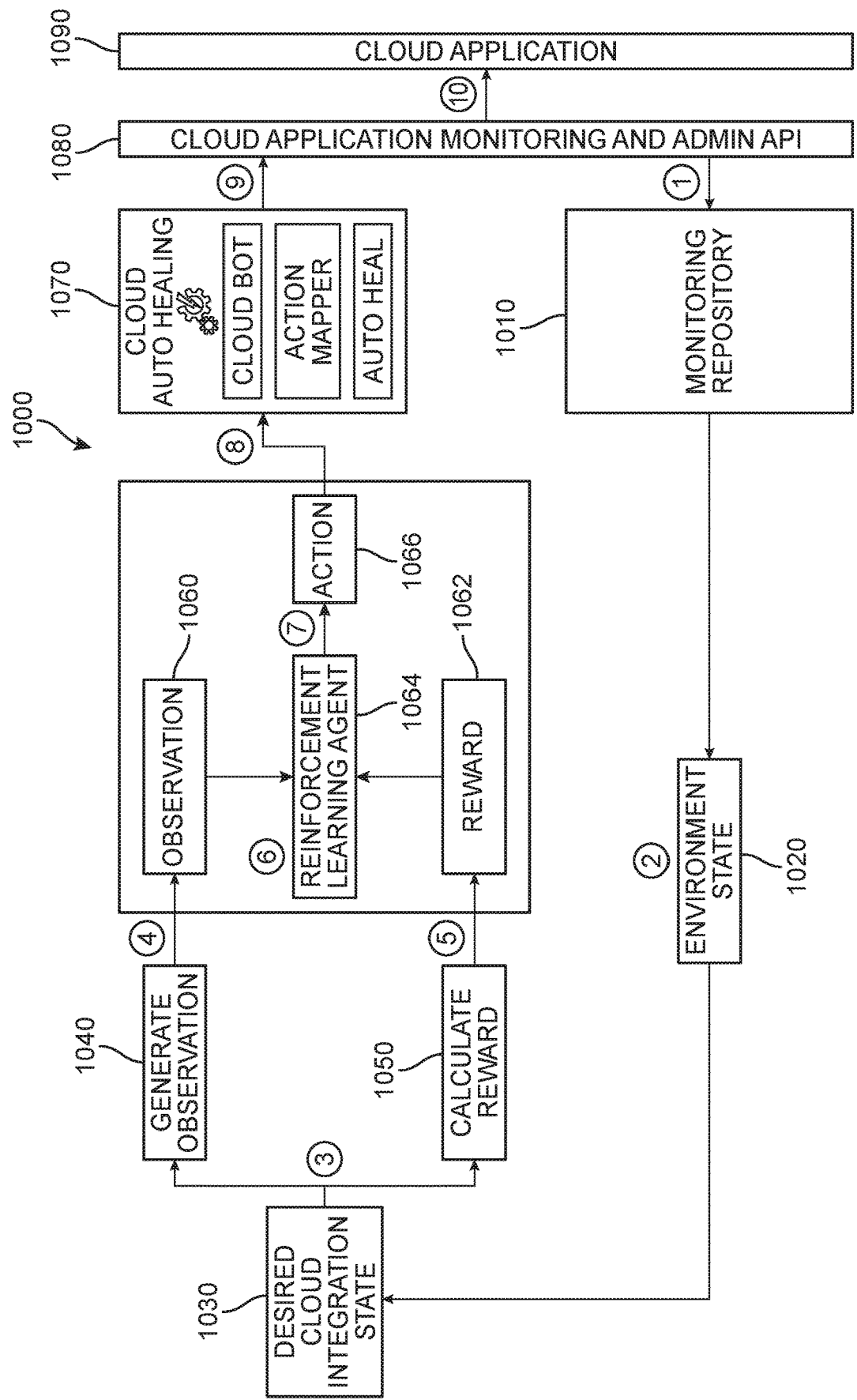
FIG. 10 is a schematic flow diagram of a process of implementing cloud monitoring and healing features, according to an embodiment.

In different embodiments, some components used by processes described above can also be utilized to monitor the operational state of the cloud integration platform that enables integration between the cloud system and the on-prem system and heal errors. For example, a cloud monitoring repository can be incorporated into the integration platform to monitor and record the overall health of the integrated system. Referring to FIG. 10, an example of an automated cloud monitoring and healing flow process ("monitoring flow") 1000 is illustrated. The monitoring flow 1000 is initiated at a first step in which a cloud application monitoring and admin API 1080 triggers or transmits a request to a monitoring repository 1010. The monitoring repository 1010 assesses the state of the computing environment 1020 in a second step, which is compared to a desired or healthy/ideal/optimized cloud integration state 1030. Based on this comparison, observation(s) 1060 are generated by an observation generator 1040 in a fourth step. In a generally concurrent fifth step, reward(s) 1062 are also calculated by a reward calculator 1050. Both the reward 1062 and observation 1060 are provided to a reinforcement learning agent (RLA) 1064 in a sixth step, which will determine one or more actions 1066 needed to address the observed discrepancies or errors in a seventh step based at least in part on a repository of error events and corresponding healing responses recorded as having been effective in repairing the error. This repository can be initially provided to the system by the service provider, and can continue to be updated and modified following subsequent error events and healing responses. A cloud auto-healing module 1070 receives actions 1066 in an eighth step and the action mapper and resultant appropriate cloud bot(s) are implemented (see FIG. 9) to perform auto-healing action(s) that have been identified as necessary for correcting the error(s). For example, many apps will have specific error codes, and based on the error code for the error detected, the bot will implement specific healing action(s) to repair it.

The output of the auto-heal action(s) is provided to the cloud application monitoring and admin API 1080 in a ninth step and shared with the cloud application in a tenth step. As shown in FIG. 10, after the action(s) are performed, the monitoring repository 1010 will engage in another environment state review. If the monitoring repository 1010 determines that the issue still persists and/or additional degradation or errors have occurred, then the system can notify an admin. In addition, the monitoring repository 1010 will record the action(s) that were taken to address the errors. If the errors are removed the system will learn that the action(s) taken were correct and should be applied to similar errors in the future. If, however, further errors are detected that impact the health of the platform, the system will learn over time to remove these action(s) as a response to the specific error, and monitor any action(s) implemented by admins or other entities for repairing the error. These action(s) will be added to the repository and referred to by the RLA 1064 in the event that the same error is detected in the future.

Further details about the operation of the intelligent cloud integration monitoring agent model will now be presented. In a first step, the algorithm receives input comprising a control period T, a cloud platform state $s_t$, and the actions applied or performed $a=\{a1, a2, \ldots, a_n\}$. In a second step, observations are generated based on the state information $o_t=f(s_t, a_{t-1})$. The reward is calculated as $r_t$ in a third step and the reinforcement learning algorithm (see below) identifies the next best action ($a_t+1$) to move closer toward the desired (optimal) cloud platform state in the fourth step. If the next best action is determined to correspond to a call out request being transmitted to a human agent, the model will continue to monitor the platform to detect the expected human action or intervention. Once the human-selected action is detected, the system will resolve the call out request and resume monitoring of the cloud platform integrations. The actions undertaken by the human agent will also be recorded for the system to learn and evolve to implement improved healing actions in the future. For example, in order for corrective actions to remain effective and/or to be appropriately identified, the artificial intelligence engine can engage in a continuous or substantially continuous training cycle based on the outcomes observed when a particular action is executed in response to a specific error.

In different embodiments, the platform can implement a cloud integration health model to determine the operational state of the platform (e.g., see second step in FIG. 10) over recurring time intervals. In one example, further details about the operation of the cloud integration health model are presented below:

$$H_{t+1} = (H_t + n_s)\left(\frac{M_{success}}{M_{total}}\right)(\Delta_t - n_e)\left(\frac{M_{error}}{M_{total}}\right)\Delta_t$$

Where t=current timestamp, $M_{success}$=messages successfully processed, $M_{error}$=messages with error(s), $n_s$=average number of messages successfully processed per $\Delta t$, $n_e$=average number of messages failed per $\Delta t$, $\Delta t$=the length of the control period or time step, $H_t$=health of the cloud platform integration at the beginning of the timestamp t. It should be understood that the equation provided herein is only one possible implementation of a cloud integration health model, and other functions may be used by the model to generate assessments and observations regarding the health of the cloud integration platform.

Furthermore, a reinforcement learning technique can be used by the RLA (see FIG. 10) to respond to sequential decision-making problem(s) involving the runtime auto healing component of the cloud integration platform. Depending on the operation state of the cloud integration platform, Platforms of Operational Load (PoL) and Operational Support Schedule (OSS) can be used by the RLA to propose the best action for the error detected by the cloud integration health model, such as to (a) continue monitoring the environment, (b) initiate an auto healing action and bot, and/or initiate a support call-out. Thus, the RLA's goal is to maximize the operational health state of the platform and thereby minimize and/or remedy error messages. In some embodiments, the operational planning of the cloud integration platform is formulated as a sequential decision-making problem using MDP (Markov Decision Processes). Sequential decision making describes a situation where the decision-maker makes successive observations of a process before a final decision is made.

In this case, the MDP is defined by its d-dimensional state space of $S \subset \mathbb{R}^d$, action space $A \subset \mathbb{R}$, transition function $f$, and cost function $\rho$. In one example, a deterministic MDP with a finite optimization horizon of T time steps may be used. Thus, at each time step y, based on the outcome of the action ($a_y \in A$), and the cloud platform system evolves from the state ($s_y \in$ to s) to ($s_{y+1} \in s$) according to $f$. Specifically: $(s_y+1)=f(s_y, a_y)$, $\forall \in \{0, 1, 2, \ldots T-1\}$, where each state transition step has an associated cost signal of $c_y=\rho(s_y, a_y) \forall k \in \{0, 1, 2, \ldots, T-1\}$. With respect to the action space, at each time step t, the RLA can take one of the following actions based on the observed state of the cloud Integration platform: $a \in (0, 1, \ldots, n)$ where a=0 represents the action of continuing to monitor the system, a=1 represents the action of auto-healing (based on the allowed auto healing actions for the detected error code), and a=2 represents the action of initiating a support call out.

Figure 11:
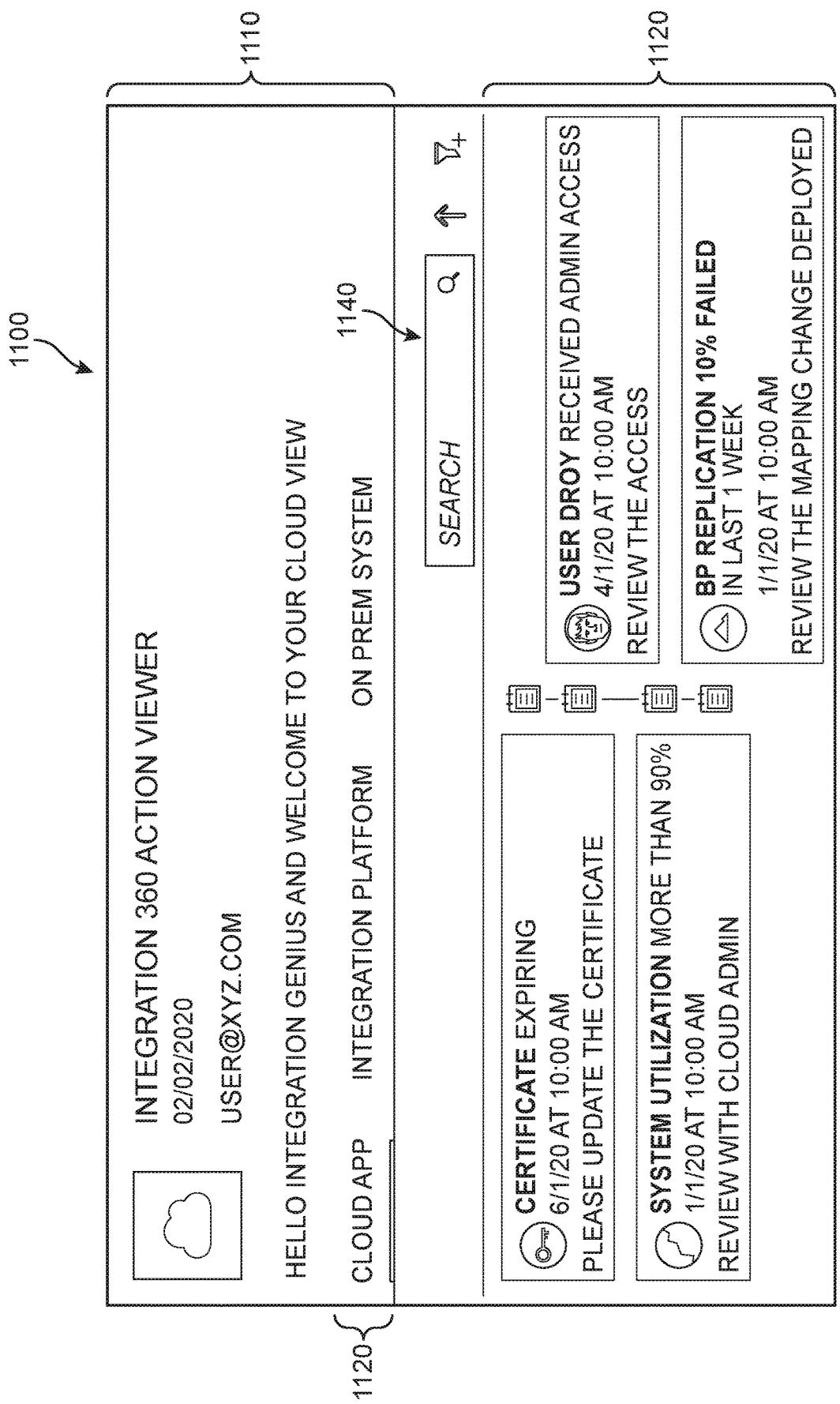
FIG. 11 is an example of a user interface for monitoring events associated with the hybrid computing platform.

For purposes of illustration, an example of a cloud platform action viewer interface 1100 is described with reference to FIG. 11. The action viewer interface 1100 offers transparency and clarity to business users navigating the integrated environment, and presents easy-to-follow visual indicators and alerts to allow the user to remain abreast of the actions being taken by the platform to address system health and otherwise provide system maintenance. In this example, the action viewer interface 1100 includes an overview panel 1110 including general details about the user and/or platform. In some embodiments, several viewing options 1120 may be provided for the user to navigate information displays for specific segments of the environment, such as cloud app view, integration platform view, and on-prem system view. Below the overview panel 1110, an action alert panel 1130 (including a search option 1140) presents a listing of recent and/or unresolved issues and/or errors that require human intervention.

Figure 12:
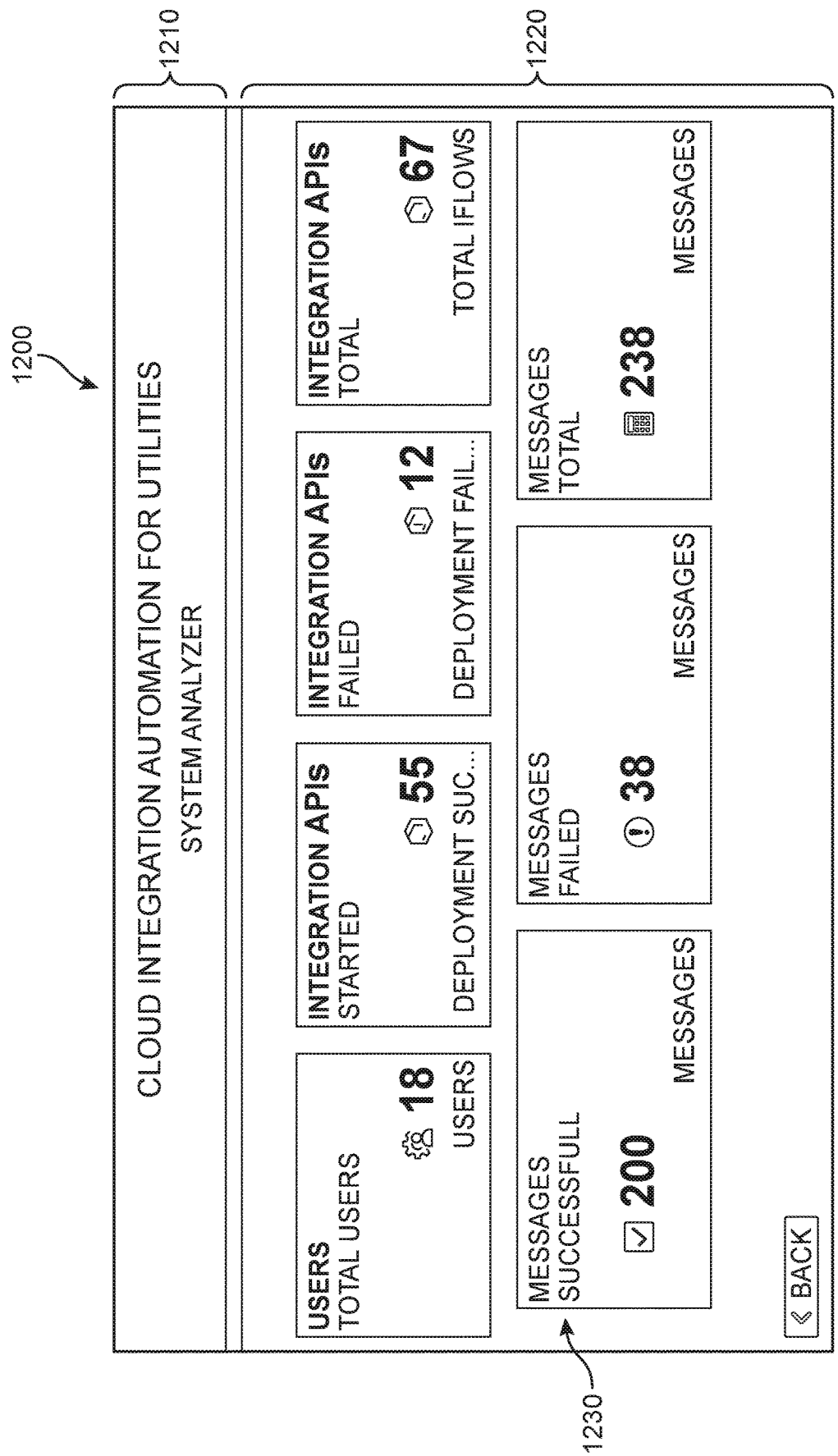
FIG. 12 is an example of a dashboard presenting an analysis of hybrid computing platform performance.

Similarly, in some embodiments, a user dashboard can be provided to admin end-users to facilitate human monitoring of the integrated environment. One example of a dashboard 1200 is illustrated in FIG. 12, presenting an analytics overview, and includes a header region 1210 ("Cloud Integration Automation For Utilities/System Analyzer") and a metrics summary 1220 which can present a summary of various aspects of the process. Such metrics and reports 1230 can present big-picture views of data such as the total number of users, the number of successfully deployed integration APIs, the number of integration APIs that failed in deployment, the total number of integration APIs that have been deployed, the number of successful messages, the number of failed messages, the total number of messages, and other pertinent metrics and/or key performance indicators (KPIs) for the integration platform. All of these numbers are updated in real time. In some embodiments, some or all of these reports can be presented in graphical form, such as bar graphs, line graphs, pie charts, cartesian graphs, percent complete indicators, etc. This dashboard 1200 may represent the front-end access to the platform.

It should be understood that the dashboard 1200 of FIG. 12 and action viewer interface 1100 represent only one possible depiction of interfaces that may be offered to the end-user, and in other embodiments, any variation in presentation style, options, menus, and graphical depictions can be used, including interfaces customized by the end-user to display the desired information. A Settings option can also be displayed to allow the end-user to create or modify the account. In addition, a number of interface layer options may be provided. For example, other options can allow the user to switch to a landing page that presents a brief summary of the user's account or a log of the user's previous activity.

Figure 13:
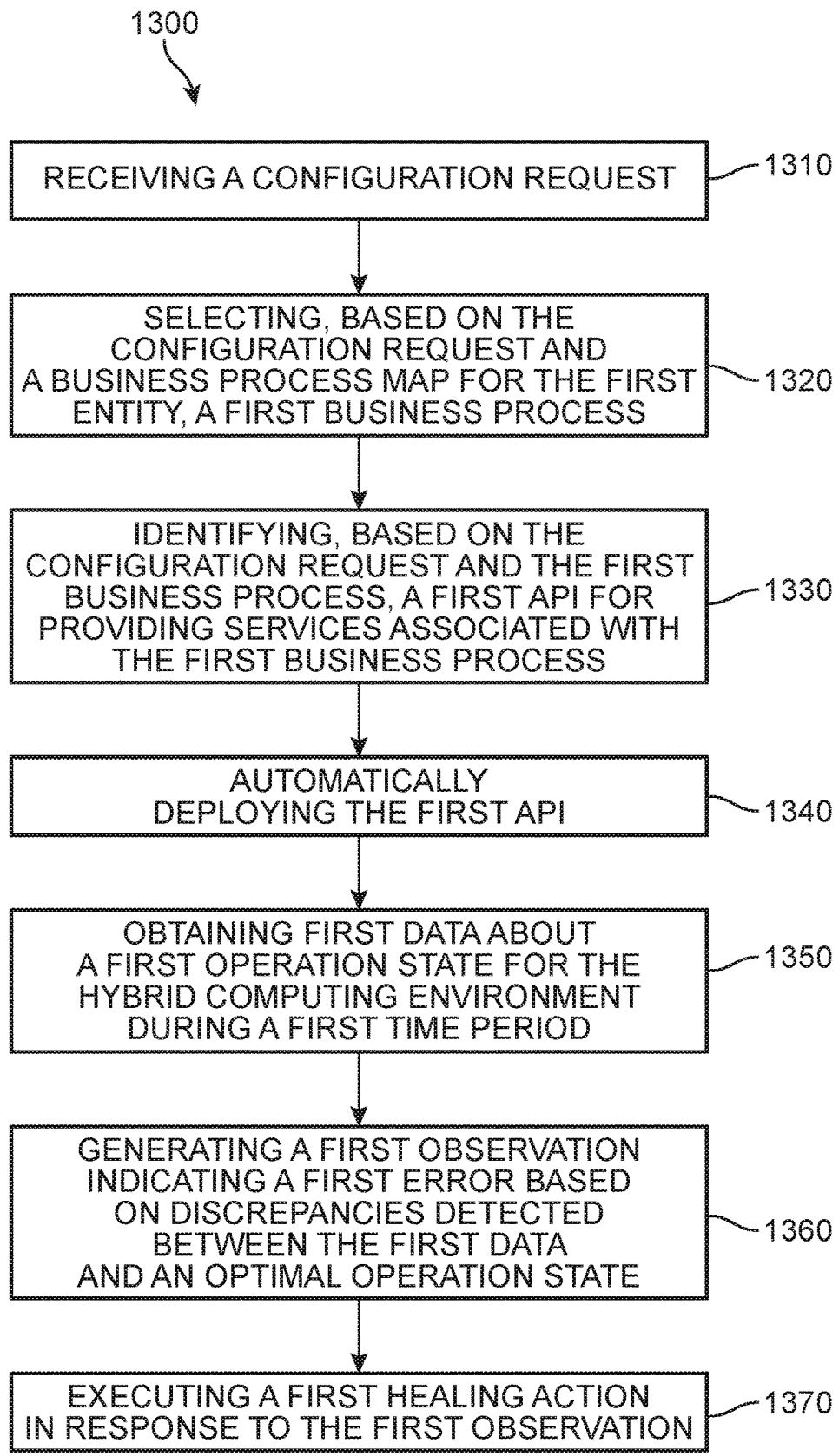
FIG. 13 is a flow chart depicting a method of automating an integration for a hybrid computing platform solution, according to an embodiment.

FIG. 13 is a flow chart illustrating an embodiment of a method 1300 of deploying and managing an integration for a hybrid computing environment. As shown in FIG. 13, a first step 1310 of the method 1300 includes receiving, from a first entity, a configuration request, and a second step 1320 of automatically selecting, based on the configuration request and a business process map for the first entity, a first business process. A third step 1330 involves automatically identifying, based on the configuration request and the first business process, a first application programming interface (API) for providing services associated with the first business process, and a fourth step 1340 includes automatically deploying the first API for performing tasks in the hybrid computing environment. In addition, a fifth step 1350 includes automatically obtaining first data about a first operation state during a first time period for the hybrid computing environment. A sixth step 1360 includes automatically generating at least a first observation indicating a first error occurring during the first time period based on discrepancies detected between the first data and data representing an optimal operation state for the hybrid computing system. Finally, a seventh step 1370 includes automatically executing a first healing action in response to the first observation.

In other embodiments, the method may include additional steps or aspects. For example, the method can further include steps of receiving cloud integration contents including pre-packaged integration content and business process documents associated with the first entity, automatically building a business process corpus based on the cloud integration contents, automatically extracting a set of features from the cloud integration contents, automatically assigning, using an ensemble classifier, each feature of the set of features to a business process category, and automatically generating the business process map based on output from the ensemble classifier. In another example, the method may include a step of determining an intent of the configuration request via a processing of the configuration request by a natural language understanding system.

In some embodiments, the method may also include steps of receiving input corresponding to an integration flow for the first API and configuration data about the hybrid computing environment, and automatically mapping features of the integration flow to elements of the configuration data using an intelligent action mapper. In such cases, the method may further include steps of building an integration command based on an output of the action mapper, automatically selecting a bot from a bot repository that is configured to execute the integration command, and automatically executing the integration command to determine a status of the deployment of the first API.

Furthermore, in some embodiments, the method can also include steps of automatically determining, based on at least the first observation and with reference to a healing action repository, that the first healing action is appropriate for resolving the first error, automatically selecting a first bot from a bot repository that is configured to execute the first healing action, and automatically deploying the first bot, where the first healing action is performed by the first bot. In such cases, the method may then also include steps of automatically obtaining, for a second time subsequent to the first time period, second data about a second operation state of the hybrid computing environment, automatically generating at least a second observation indicating a second error occurring during the second time based on discrepancies detected between the second data and the data representing the optimal operation state, determining the first error and the second error both correspond to the same error type, and automatically transmitting, to an administrator for the hybrid computing environment, in response to determining that the first error and second error correspond to the same error type, a message about the first observation and the second observation.

In another example, the method can further include steps of automatically obtaining third data about a second healing action performed by the administrator in response to the message, and automatically adding the second healing action to the healing action repository as being appropriate for resolving the error type to which the first error and second error correspond. In some embodiments, the method can then also involve automatically removing, from the healing action repository, the first healing action from a list of healing actions appropriate for resolving the error type to which the first error and second error correspond.

In some other embodiments, the method may also include automatically obtaining, for a second time subsequent to the first time period, second data about a second operation state of the hybrid computing environment, automatically confirming that the first healing action successfully repaired the first error based on a comparison between the second data and the data representing the optimal operation state, and automatically updating the healing action repository to reinforce a relationship between the first bot and the first healing action.

It should be understood that the systems and/or methods as described herein may be implemented using different computing systems, components, modules, and connections. An end-user or administrator may access various interfaces provided or supported by the policy management service, for example, via one or more devices capable of receiving, generating, storing, processing, and/or providing information, such as information described herein. For example, a user device may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device may receive information from and/or transmit information to the policy management service platform. For example, a device may include a bus, a processor, a memory, a storage component, an input component, an output component, and a communication interface.

The bus will include a component that permits communication among the components of the device. The processor is implemented in hardware, firmware, or a combination of hardware and software. The processor is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, a processor includes one or more processors capable of being programmed to perform a function. Memory includes a random access memory (RAM), a read only memory (ROM), and/or another type of dynamic or static storage device (e.g., a flash memory, a magnetic memory, and/or an optical memory) that stores information and/or instructions for use by a processor(s).

In addition, storage components store information and/or software related to the operation and use of the device. For example, storage components may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Furthermore, an input component includes a component that permits the device to receive information, such as via user input (e.g., a touch screen display, a keyboard, a keypad, a mouse, a button, a switch, and/or a microphone). Additionally, or alternatively, input components may include a sensor for sensing information (e.g., a global positioning system (GPS) component, an accelerometer, a gyroscope, and/or an actuator). The output component includes a component that provides output information from a device (e.g., a display, a speaker, and/or one or more light-emitting diodes (LEDs)).

A communication interface includes a transceiver-like component (e.g., a transceiver and/or a separate receiver and transmitter) that enables a device to communicate with other devices, such as via a wired connection, a wireless connection, or a combination of wired and wireless connections. The communication interface may permit the device to receive information from another device and/or provide information to another device. For example, a communication interface may include an Ethernet interface, an optical interface, a coaxial interface, an infrared interface, a radio frequency (RF) interface, a universal serial bus (USB) interface, a Wi-Fi interface, a cellular network interface, and/or the like.

Thus, the device may perform one or more processes described herein. The device may perform these processes based on processor executing software instructions stored by a non-transitory computer-readable medium, such as memory and/or storage component. A computer-readable medium is defined herein as a non-transitory memory device. A memory device includes memory space within a single physical storage device or memory space spread across multiple physical storage devices.

Software instructions may be read into memory and/or storage components from another computer-readable medium or from another device via communication interface. When executed, software instructions stored in memory and/or storage component may cause processor to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

In some implementations, a policy management service may be hosted in a cloud computing environment. Notably, while implementations described herein describe a policy management service as being hosted in cloud computing environment, in some implementations, a policy management service may not be cloud-based (i.e., may be implemented outside of a cloud computing environment) or may be partially cloud-based.

Cloud computing environment can include, for example, an environment that hosts the policy management service. The cloud computing environment may provide computation, software, data access, storage, etc. services that do not require end-user knowledge of a physical location and configuration of system(s) and/or device(s) that hosts the policy management service. For example, a cloud computing environment may include a group of computing resources (referred to collectively as "computing resources" and individually as "computing resource").

Computing resources includes one or more personal computers, workstation computers, server devices, or other types of computation and/or communication devices. In some implementations, computing resources may host the policy management service. The cloud resources may include compute instances executing in computing resource, storage devices provided in computing resource, data transfer devices provided by computing resource, etc. In some implementations, computing resource may communicate with other computing resources via wired connections, wireless connections, or a combination of wired and wireless connections. In some embodiments, a computing resource includes a group of cloud resources, such as one or more applications ("APPs"), one or more virtual machines ("VMs"), virtualized storage ("VSs"), one or more hypervisors ("HYPs"), and/or the like.

Application includes one or more software applications that may be provided to or accessed by user devices. Application may eliminate a need to install and execute the software applications on a user device. For example, an application may include software associated with the policy management service and/or any other software capable of being provided via cloud computing environment, while in some embodiments, other applications are provided via virtual machines. A virtual machine can include a software implementation of a machine (e.g., a computer) that executes programs like a physical machine. A virtual machine may be either a system virtual machine or a process virtual machine, depending upon use and degree of correspondence to any real machine by virtual machine. A system virtual machine may provide a complete system platform that supports execution of a complete operating system ("OS"). A process virtual machine may execute a single program, and may support a single process. In some embodiments, virtual machines may execute on behalf of a user (e.g., a user of user device or an administrator of the policy management service), and may manage infrastructure of cloud computing environment, such as data management, synchronization, or long-duration data transfers.

Virtualized storage includes one or more storage systems and/or one or more devices that use virtualization techniques within the storage systems or devices of computing resources. In some embodiments, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisors may provide hardware virtualization techniques that allow multiple operating systems (e.g., "guest operating systems") to execute concurrently on a host computer, such as a computing resource. Hypervisors may present a virtual operating platform to the guest operating systems, and may manage the execution of the guest operating systems. Multiple instances of a variety of operating systems may share virtualized hardware resources.

A network includes one or more wired and/or wireless networks. For example, networks may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of deploying and managing an integration for a hybrid computing environment, the method comprising:
   extracting a first business process features set from pre-packaged integration contents, industry artifacts, and business process documents;
   determining a Boolean value for each feature of the first business process features set and a predefined business process area;
   classifying each feature of the first business process features set using the Boolean values, thereby identifying a first set of business sub-processes and sub-areas;
   generating a business process map for APIs (Application Programming Interfaces) (BPMA) based on the first set of business sub-processes and sub-areas, the BPMA representing relationships between each feature of the first business process features set and a plurality of APIs;
   receiving, from a first entity, a first configuration request for a first business sub-process;
   extracting a second business process features set from the first configuration request;
   approximating, using a regression algorithm, a functional area for each feature of the second business process features set;
   creating, using the approximated functional areas, a business process navigation path;
   validating the business process navigation path by reference to the BPMA;

identifying, using a cognitive operation and based on the business process navigation path, at least a first API that is associated with the first business sub-process;

creating an integration flow that includes at least the first API and is configured to perform the requested first business sub-process;

deploying the integration flow selecting, via a business process map selection machine learning model and based on the integration flow and BPMA, a business process; and receiving, at a knowledge graph builder, the selected business process, the integration flow, and the BPMA, wherein the knowledge graph builder:

extracts an API metadata feature set from the integration API using a natural language processor, identifies, for each metadata feature in the API metadata feature set, associated parent nodes using a cognitive function based on identification of a relationship between a given parent node and metadata feature, structures the extracted API metadata feature set as structured information, generates, via a knowledge graph machine learning model, a graph builder using the structured information, and outputs, via the graph builder, an API knowledge graph that represents relationships between components in the integration flow by plotting the relationships between each metadata feature and their associated parent nodes.

2. The method of claim 1, further comprising:

automatically obtaining first data about a first operation state during a first time period for the hybrid computing environment;

automatically generating at least a first observation indicating a first error occurring during the first time period based on discrepancies detected between the first data and data representing an optimal operation state for the hybrid computing system; and automatically executing a first healing action in response to the first observation.

3. The method of claim 1, further comprising:

receiving, at an action mapper, input corresponding to the integration flow, the API knowledge graph, configuration data about the hybrid computing environment;

extracting, at the action mapper, configurable API data from the integration flow and knowledge graph; and mapping, at the action mapper and using natural language processing techniques, the extracted configurable API data to the configuration data, thereby creating a value map.

4. The method of claim 3, further comprising:

providing the value map to a query builder module;

building, at the query builder module and based on the value map, a command;

identifying, at a bot identifier using a cognitive operation, an appropriate bot from a repository of bots configured to execute the command;

executing, via the identified bot, the command, thereby configuring, deploying, and validating the integration flow; and outputting a cloud component deployment status.

5. The method of claim 2, further comprising:

automatically determining, based on at least the first observation and with reference to a healing action repository, that the first healing action is appropriate for resolving the first error;

automatically selecting a first bot from a bot repository that is configured to execute the first healing action; and automatically deploying the first bot, wherein the first healing action is performed by the first bot.

6. The method of claim 5, further comprising:

automatically obtaining, for a second time subsequent to the first time period, second data about a second operation state of the hybrid computing environment;

automatically generating at least a second observation indicating a second error occurring during the second time based on discrepancies detected between the second data and the data representing the optimal operation state;

determining the first error and the second error both correspond to the same error type; and automatically transmitting, to an administrator for the hybrid computing environment, in response to determining that the first error and second error correspond to the same error type, a message about the first observation and the second observation.

7. The method of claim 6, further comprising:

automatically obtaining third data about a second healing action performed by the administrator in response to the message; and automatically adding the second healing action to the healing action repository as being appropriate for resolving the error type to which the first error and second error correspond.

8. The method of claim 7, further comprising automatically removing, from the healing action repository, the first healing action from a list of healing actions appropriate for resolving the error type to which the first error and second error correspond.

9. The method of claim 5, further comprising:

automatically obtaining, for a second time subsequent to the first time period, second data about a second operation state of the hybrid computing environment;

automatically confirming that the first healing action successfully repaired the first error based on a comparison between the second data and the data representing the optimal operation state; and automatically updating the healing action repository to reinforce a relationship between the first bot and the first healing action.

10. A system of deploying and managing an integration for a hybrid computing environment, the system comprising:

a processor;

machine-readable media including instructions which, when executed by the processor, cause the processor to:

extract a first business process features set from prepackaged integration contents, industry artifacts, and business process documents;

determine a Boolean value for each feature of the first business process features set and a predefined business process area;

classify each feature of the first business process features set using the Boolean values, thereby identifying a first set of business sub-processes and sub-areas;

generate a business process map for APIs (Application Programming Interfaces) (BPMA) based on the first set of business sub-processes and sub-areas, the BPMA representing relationships between each feature of the first business process features set and a plurality of APIs;

receive, from a first entity, a configuration request for a first business sub-process;

extract a second business process features set from the first configuration request;

approximate, using a regression algorithm, a functional area for each feature of the second business process features set;

create, using the approximated functional areas, a business process navigation path;

validate the business process navigation path by reference to the BPMA;

identify, using a cognitive operation and based on the business process navigation path, at least a first API that is associated with the first business sub-process;

create an integration flow that includes at least the first API and is configured to perform the requested first business sub-process;

deploy the integration flow select, via a business process map selection machine learning model and based on the integration flow and BPMA, a business process; and receive, at a knowledge graph builder, the selected business process, the integration flow, and the BPMA, wherein the knowledge graph builder:

extracts an API metadata feature set from the integration API using a natural language processor, identifies, for each metadata feature in the API metadata feature set, associated parent nodes using a cognitive function based on identification of a relationship between a given parent node and metadata feature, structures the extracted API metadata feature set as structured information, generates, via a knowledge graph machine learning model, a graph builder using the structured information, and outputs, via the graph builder, an API knowledge graph that represents relationships between components in the integration flow by plotting the relationships between each metadata feature and their associated parent nodes.

11. The system of claim 10, wherein the instructions further cause the processor to:

automatically obtain first data about a first operation state during a first time period for the hybrid computing environment;

automatically generate at least a first observation indicating a first error occurring during the first time period based on discrepancies detected between the first data and data representing an optimal operation state for the hybrid computing system; and automatically execute a first healing action in response to the first observation.

12. The system of claim 10, wherein the instructions further cause the processor to:

receive, at an action mapper, input corresponding to the integration flow, the API knowledge graph, configuration data about the hybrid computing environment;

extract, at the action mapper, configurable API data from the integration flow and knowledge graph; and map, at the action mapper and using natural language processing techniques, the extracted configurable API data to the configuration data, thereby creating a value map.

13. The system of claim 12, wherein the instructions further cause the processor to:

provide the value map to a query builder module;

build, at the query builder module and based on the value map, a command;

identify, at a bot identifier using a cognitive operation, an appropriate bot from a repository of bots configured to execute the command;

execute, via the identified bot, the command, thereby configuring, deploying, and validating the integration flow; and output a cloud component deployment status.

14. The system of claim 11, wherein the instructions further cause the processor to:

automatically determine, based on at least the first observation and with reference to a healing action repository, that the first healing action is appropriate for resolving the first error;

automatically select a first bot from a bot repository that is configured to execute the first healing action; and automatically deploy the first bot, wherein the first healing action is performed by the first bot.

15. The system of claim 14, wherein the instructions further cause the processor to:

automatically obtain, for a second time subsequent to the first time period, second data about a second operation state of the hybrid computing environment;

automatically generate at least a second observation indicating a second error occurring during the second time based on discrepancies detected between the second data and the data representing the optimal operation state;

determine the first error and the second error both correspond to the same error type; and automatically transmit, to an administrator for the hybrid computing environment, in response to determining that the first error and second error correspond to the same error type, a message about the first observation and the second observation.

16. The system of claim 15, wherein the instructions further cause the processor to:

automatically obtain third data about a second healing action performed by the administrator in response to the message; and automatically add the second healing action to the healing action repository as being appropriate for resolving the error type to which the first error and second error correspond.

17. The system of claim 16, wherein the instructions further cause the processor to automatically remove, from the healing action repository, the first healing action from a list of healing actions appropriate for resolving the error type to which the first error and second error correspond.

18. A system comprising one or more computers and one or more storage devices storing instructions that are operable, when executed by the one or more computers, to cause the one or more computers to:

extract a first business process features set from pre-packaged integration contents, industry artifacts, and business process documents;

determine a Boolean value for each feature of the first business process features set and a predefined business process area;

classify each feature of the first business process features set using the Boolean values, thereby identifying a first set of business sub-processes and sub-areas;

generate a business process map for APIs (Application Programming Interfaces) (BPMA) based on the first set of business sub-processes and sub-areas, the BPMA representing relationships between each feature of the first business process features set and a plurality of APIs;

receive, from a first entity, a first configuration request for a first business sub-process;
extract a second business process features set from the first configuration request;
approximate, using a regression algorithm, a functional area for each feature of the second business process features set;
create, using the approximated functional areas, a business process navigation path;
validate the business process navigation path by reference to the BPMA;
identify, using a cognitive operation and based on the business process navigation path, at least a first API that is associated with the first business sub-process;
create an integration flow that includes at least the first API and is configured to perform the requested first business sub-process;
deploy the integration flow
select, via a business process map selection machine learning model and based on the integration flow and BPMA, a business process; and
receive, at a knowledge graph builder, the selected business process, the integration flow, and the BPMA, wherein the knowledge graph builder:
  extracts an API metadata feature set from the integration API using a natural language processor,
  identifies, for each metadata feature in the API metadata feature set, associated parent nodes using a cognitive function based on identification of a relationship between a given parent node and metadata feature,
  structures the extracted API metadata feature set as structured information,
  generates, via a knowledge graph machine learning model, a graph builder using the structured information, and
outputs, via the graph builder, an API knowledge graph that represents relationships between components in the integration flow by plotting the relationships between each metadata feature and their associated parent nodes.

* * * * *